(12) United States Patent
Andrews et al.

(10) Patent No.: US 11,448,595 B2
(45) Date of Patent: Sep. 20, 2022

(54) PRISM-COUPLING SYSTEMS AND METHODS WITH IMPROVED INTENSITY TRANSITION POSITION DETECTION AND TILT COMPENSATION

(71) Applicant: CORNING INCORPORATED, Corning, NY (US)

(72) Inventors: Ryan Claude Andrews, Elmira, NY (US); Rostislav Vatchev Roussev, Painted Post, NY (US); Antons Treikalis, Elmira, NY (US); Ming Yang, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 76 days.

(21) Appl. No.: 17/084,738

(22) Filed: Oct. 30, 2020

(65) Prior Publication Data

US 2021/0131959 A1 May 6, 2021

Related U.S. Application Data

(60) Provisional application No. 62/929,351, filed on Nov. 1, 2019.

(51) Int. Cl.
*G01N 21/41* (2006.01)
*G01N 21/84* (2006.01)

(52) U.S. Cl.
CPC ............ *G01N 21/41* (2013.01); *G01N 21/84* (2013.01); *G01N 2201/02* (2013.01); *G01N 2201/0635* (2013.01); *G01N 2201/125* (2013.01)

(58) Field of Classification Search
CPC .... G01N 21/41; G01N 21/84; G01N 2201/02; G01N 2201/0635; G01N 2201/125
(Continued)

(56) References Cited

U.S. PATENT DOCUMENTS 3,069,654 A 12/1962 Hough
7,702,258 B2 4/2010 Kim et al.
(Continued)

FOREIGN PATENT DOCUMENTS

CN 105569921 A 5/2016
JP 11-281501 A 10/1999
WO 2009/105731 A1 8/2009

OTHER PUBLICATIONS

Chakraborti et al., "Transition detection in image processing", Signal Processing, vol. 13, Issue 2, Sep. 1987, pp. 197-207.
(Continued)

*Primary Examiner* — Isiaka O Akanbi
(74) *Attorney, Agent, or Firm* — Kevin M. Johnson

(57) ABSTRACT

The prism-coupling systems and methods include using a prism-coupling system to collect a 2D digital mode spectrum of an IOX article. The mode line and critical angle positions and orientations are found by performing a weighted fit to mode line and critical angle images and are used to define a compensated mode spectrum. If mode line tilt is found, it is removed from the 2D digital mode spectrum to define the compensated mode spectrum. The compensated mode spectrum is then processed using techniques known in the art to provide a more accurate estimate of stress-related characteristics of the IOX sample versus using the uncompensated mode spectrum. Derivative-based methods of accurately establishing positions of intensity transitions in a mode spectrum of an IOX sample using a derivative spectrum and curve fitting are also disclosed.

20 Claims, 19 Drawing Sheets

(58) Field of Classification Search
USPC .................................................. 356/135, 365
See application file for complete search history.

(56) References Cited

U.S. PATENT DOCUMENTS

| | | | |
|---|---|---|---|
| 8,629,918 B2 | 1/2014 | Takagi | |
| 9,140,543 B1 * | 9/2015 | Allan | ..................... G01B 11/16 |
| 9,160,884 B2 | 10/2015 | Kawatani et al. | |
| 9,534,981 B2 | 1/2017 | Roussev et al. | |
| 9,897,574 B2 | 2/2018 | Roussev et al. | |
| 9,983,064 B2 * | 5/2018 | Roussev | ................. G01N 21/23 |
| 2009/0238489 A1 | 9/2009 | Metcalfe et al. | |
| 2014/0368808 A1 * | 12/2014 | Roussev | ................... G01L 1/24 |
| | | | 356/32 |
| 2015/0066393 A1 * | 3/2015 | Liu | ........................... G01L 1/24 |
| | | | 702/42 |
| 2016/0356760 A1 | 12/2016 | Roussev et al. | |
| 2018/0122083 A1 | 5/2018 | Wang | |
| 2019/0033144 A1 | 1/2019 | Andrews et al. | |
| 2019/0301952 A1 | 10/2019 | Andrews et al. | |

OTHER PUBLICATIONS

Wikipedia, "Hough transform", Available Online at <https://en.wikipedia.org/w/index.php?title=Hough_transform&oldid=950512103>, Apr. 12, 2020, 9 pages.

Invitation to Pay Additional Fees of the International Searching Authority; PCT/US2020/057278; mailed on Mar. 19, 2021, 11 pages; European Patent Office.

Ruffato et al., "Implementation and testing of a compact and highresolution sensing device based on grating-coupled surface plasmon resonance with polarization modulation", Sensors and Actuators B: Chemical, vol. 185 , pp. 179-187.

* cited by examiner

PRISM-COUPLING SYSTEMS AND METHODS WITH IMPROVED INTENSITY TRANSITION POSITION DETECTION AND TILT COMPENSATION

This application claims the benefit of priority of U.S. Provisional Application Ser. No. 62/929,351 filed on Nov. 1, 2019, the content of which is relied upon and incorporated herein by reference in its entirety.

The present disclosure relates to prism-coupling systems and methods used for characterizing stress in glass-based chemically strengthened articles, and in particular relates to such systems and methods having improved intensity transition position detection and tilt compensation.

BACKGROUND

Chemically strengthened glass-based articles are formed by subjecting glass-based substrates to a chemical modification to improve at least one strength-related characteristic, such as hardness, resistance to fracture, etc. Chemically strengthened glass-based articles have found particular use as cover glasses for display-based electronic devices, especially hand-held devices such as smart phones and tablets.

In one method, the chemical strengthening is achieved by an ion-exchange (IOX) process whereby ions in the matrix of a glass-based substrate ("native ions" or "substrate ions") are replaced by externally introduced (i.e., replacement or in-diffused) ions, e.g., from a molten bath. The strengthening generally occurs when the replacement ions are larger than the native ions (e.g., $Na^+$ or $Li^+$ ions replaced by $K^+$ ions). The IOX process gives rise to an IOX region in the glass that extends from the article surface into the matrix. The IOX region defines within the matrix a refractive index profile having a depth of layer (DOL) that represents a size, thickness or "deepness" of the IOX region as measured relative to the article surface. The refractive index profile also defines stress-related characteristics, including: a stress profile, a knee stress, a center tension, a tension-strain energy, a birefringence, a spike depth, a depth of layer, and a refractive index profile. The refractive index profile can also define in the glass-based article an optical waveguide that supports a number m of guided modes for light of a given wavelength when the refractive index profile meets certain criteria known in the art.

Prism-coupling systems and methods can be used to measure the spectrum of the guided modes of the planar optical waveguide formed in the glass-based IOX article to characterize one or more properties of the IOX region, such as the refractive index profile and the aforementioned stress-related characteristics. This technique has been used to measure properties of glass-based IOX articles used for a variety of applications, such as for chemically strengthened covers for displays (e.g., for smart phones). Such measurements are used for quality control purposes to ensure that the IOX region has the intended characteristics and falls within the select design tolerances for each of the selected characteristics for the given application.

Measurement of stress-related characteristics using prism coupling relies on the formation and detection of transverse magnetic (TM) and transverse electric (TE) mode spectra having respective intensity transitions in the form of TM and TE mode lines and TM and TE critical angle transitions. The TM and TE mode lines need to be relatively sharp (i.e., have a high contrast) so that the mode line positions can be accurately established. Likewise, the critical angle transition also needs to be relatively sharp so that its position can be accurately established. This is because the positions of the mode lines and the critical angle transitions are used in the calculations to determine the stress-related characteristics of the IOX article, and any error in the position of the mode lines or critical angle transitions (which can arise from mode-line tilt and contrast reduction) translate into errors in the calculated stress-related characteristic.

Unfortunately, prism-coupling systems used to characterize stress-related characteristics of IOX articles are imperfect so that the formation of the TM and TE mode lines is imperfect, having both reduced contrast and tilt. Consequently, there is a need for improved prism-coupling systems and methods that provide accurate estimates of the positions and orientations of the mode lines and critical angle transitions that lead to more accurate calculations of stress-related characteristics of the sample being measured.

The prism-coupling systems and methods described herein include using a prism-coupling system to collect a 2D digital mode spectrum of an IOX article. The mode spectrum has mode lines, which can be tilted relative to their ideal orientation due to system imperfections. Such tilt can cause errors in estimating stress-related characteristics of the IOX article. The methods include accurately establishing an amount of tilt in the mode lines by performing a weighted fit to the 2D digital mode spectrum for each mode line about the intensity extrema associated with each mode line. The established tilt is then used to adjust the measurement system via either hardware or software to either reduce or eliminate the average tilt, which results in the 2D digital mode spectrum being reduced by the tilt to define a compensated mode spectrum. The compensated mode spectrum is then processed using techniques known in the art to estimate one or more stress-related characteristics of the IOX article. This provides a more accurate estimate of stress-related characteristics of the IOX article as compared to using the uncompensated mode spectrum having tilted mode lines.

The weighted fit methods disclosed herein are based on analytical (closed-form) solutions that establish the locations (positions) and tilt angles (orientations) of the mode lines with a high degree of accuracy. The fitted lines are then used to define an updated or "compensated" digital mode spectrum that is used for estimating the at least one stress-related characteristic of the IOX article.

SUMMARY

The weighted fit methods use the 2D mode spectrum image to find the slope and intercept of each mode line directly rather than the approach of using a 1D average gray level intensity to directly find only the positions of the mode lines. The accuracy of the 1D averaging method is limited because the act of averaging the mode spectrum prevents the extraction of mode line details and information needed to accurately establish the slope and intercept of the mode lines.

According to aspect (1), a method of estimating at least one stress-related characteristic of an ion-exchange (IOX) article having a waveguide region is provided. The method comprises: using a prism-coupling system, illuminating the IOX article through a coupling prism to generate transverse magnetic (TM) and transverse electric (TE) guided modes in the waveguide region of the IOX article; capturing a digital two-dimensional (2D) mode spectrum comprising mode lines of TM and TE mode spectra representative of the TM and TE guided modes of the waveguide region, wherein each mode line is defined by a 2D intensity profile having intensity values and an intensity extremum and having an amount of tilt in a first direction as measured relative to an ideal reference orientation; locating the mode lines by fitting at least one of the mode lines in the vicinity of its intensity extremum in the in the 2D mode spectrum using a weighted least square regression method in the vicinity of the intensity extremum; measuring the amount of tilt by establishing a fitted line to at least one of the mode lines in the 2D mode spectrum using a weighted least-square regression fitting of the 2D intensity profile in a vicinity of the intensity extremum; substantially removing the amount of tilt from the mode lines by adding the measured amount of tilt in a second direction opposite to the first direction to define at least one of a tilt-compensated TM mode spectrum and a tilt-compensated TE mode spectrum; and estimating the at least one stress-related characteristic of the IOX article using at least one of the tilt-compensated TM mode spectrum and the tilt-compensated TE mode spectrum.

According to aspect (2), the method according to aspect (1) is provided, wherein the intensity extremum comprises an intensity minimum.

According to aspect (3), the method according to any of aspects (1) to (2) is provided, further comprising averaging the 2D mode spectrum to form a one-dimensional (1D) spectrum having an averaged intensity extremum for each mode line and determining an initial position for each mode line using the averaged intensity extremum.

According to aspect (4), the method according to any of aspects (1) to (3) is provided, wherein the 2D mode spectrum comprises a digital mode spectrum image having a gray scale intensity distribution based on pixel intensity values, and wherein the weighted least square regression method comprises for each mode line: defining a weighting that emphasizes pixel intensity values closer to the intensity extremum to force the fitted line to more closely hew to the 2D intensity extremum.

According to aspect (5), the method according to aspect (4) is provided, wherein the weighting is defined by an exponential weighting function.

According to aspect (6), the method according to any of aspects (1) to (5) is provided, further comprising: determining an average variance of the fitted line to the 2D intensity profile in the vicinity of the intensity extremum; and using the average variance for each mode line to assess whether each mode line is a true mode line or a false mode line.

According to aspect (7), the method according to any of aspects (1) to (6) is provided, wherein there are K mode lines, and further comprising: determining from the mode lines a tilt slope $\alpha_k$ for each mode line, an average tilt slope $\overline{\alpha}$ and a standard deviation $\overline{\sigma}$ of a tilt slope to define a slope variation parameter;

$$a_{zk} = \frac{a_k - \overline{a}}{\sigma}; k = 1, 2 \ldots K$$

and defining a threshold parameter T, wherein $\alpha_{zk}$<T for a given mode line means the mode line is a true mode line.

According to aspect (8), the method according to aspect (7) is provided, wherein T≤2.

According to aspect (9), the method according to any of aspects (1) to (8) is provided, wherein the at least one stress-related characteristic comprises at least one of: a stress profile, a knee stress, a center tension, a tension-strain energy, a birefringence, a spike depth, a depth of layer, and a refractive index profile.

According to aspect (10), the method according to any of aspects (1) to (9) is provided, wherein the 2D mode spectrum is captured on a rotatable detector, and wherein the act of substantially removing the amount of tilt from the mode lines by adding the measured amount of tilt is performed by rotating the rotatable detector.

According to aspect (11), the method according to any of aspects (1) to (9) is provided, wherein the 2D mode spectrum is captured on a digital detector, and wherein the act of substantially removing the amount of tilt from the mode lines by adding the measured amount of tilt is performed by digitally rotating the mode spectrum.

According to aspect (12), a method of compensating for a tilt bias in a prism-coupling system used for estimating at least one stress-related characteristic of an ion-exchange (IOX) article having a waveguide region is provided. The method comprises: capturing for each of a plurality of IOX articles a digital two-dimensional (2D) mode spectrum comprising mode lines of TM and TE mode spectra representative of the TM and TE guided modes of the waveguide region, wherein each mode line is defined by a 2D intensity profile having an intensity extremum and having an amount of tilt in a first direction as measured relative to an ideal reference orientation; measuring the amount of tilt in each mode line by establishing for each mode line a fitted line to the 2D mode spectrum using a weighted fitting of the 2D intensity profile in a vicinity of the intensity extremum; averaging the tilts for the mode lines to establish the tilt bias for the prism-coupling system; and adjusting the measurement system to reduce or eliminate the established tilt bias from at least one of the captured mode spectra to reduce the amount of tilt in each mode line and define a compensated mode spectrum for at least one of the plurality of IOX articles.

According to aspect (13), the method according to aspect (12) is provided, further comprising: adjusting the measurement system to reduce or eliminate the established tilt bias from a subsequently captured mode spectrum of an additional IOX article to reduce the amount of tilt in each mode line and define a compensated mode spectrum for the additional IOX article.

According to aspect (14), the method according to any of aspects (12) to (13) is provided, further comprising measuring a variance in the tilts of the mode lines and comparing each tilt to the variance to establish whether each mode line is a true mode line or a false mode line.

According to aspect (15), the method according to any of aspects (12) to (14) is provided, wherein the amount of tilt is measured as either a tilt angle or a tilt slope.

According to aspect (16), the method according to any of aspects (12) to (15) is provided, wherein the at least one stress-related characteristic comprises at least one of: a stress profile, a knee stress, a center tension, a tension-strain energy, a birefringence, a spike depth, a depth of layer, and a refractive index profile.

According to aspect (17), the method according to any of aspects (12) to (16) is provided, wherein the 2D mode spectrum is captured on a rotatable detector, and wherein the act of subtracting the established tilt bias is performed by rotating the rotatable detector.

According to aspect (18), the method according to any of aspects (12) to (16) is provided, wherein the 2D mode spectrum is captured on a digital detector, and wherein the act of subtracting the established tilt bias is performed by digitally rotating the mode spectrum.

According to aspect (19), the method according to any of aspects (12) to (18) is provided, further comprising: calculating a tilt bias variance in the tilt bias from the amount of tilt in each mode line.

According to aspect (20), the method according to any of aspects (12) to (19) is provided, wherein the tilt bias and the tilt bias variance are respectively calculated as a running tilt bias and a running tilt bias variance as the 2D mode spectra from the IOX samples are captured.

According to aspect (21), a method of estimating at least one stress-related characteristic of an ion-exchange (IOX) article having a waveguide region is provided.

The method comprising: using a prism-coupling system, illuminating the IOX article through a coupling prism to generate transverse magnetic (TM) and transverse electric (TE) guided modes in the waveguide region of the IOX article; capturing a digital two-dimensional (2D) mode spectrum comprising mode lines of TM and TE mode spectra representative of the TM and TE guided modes of the waveguide region, wherein the 2D mode spectrum runs generally in a y-direction and wherein each mode line has a long dimension that runs generally in an x-direction and a two-dimensional gray-scale intensity distribution I(x,y) based on pixel intensity values; for each mode line, averaging the pixel intensity values in the x-direction to create a one-dimensional gray-scale intensity distribution I(y); approximating an initial position of each mode line by locating an extremum in the pixel intensity values of the one-dimensional gray-scale intensity distribution for the given mode line; wherein the pixel intensity values of the one-dimensional gray-scale intensity distribution comprise pixel intensity values in a vicinity of the extremum and performing for each mode line a weighted least squares fit, wherein the pixel intensity values closer to the extremum in the one-dimensional gray-scale intensity distribution are weighted greater than those of the pixel intensity values that are farther from the extremum in the one-dimensional gray-scale intensity distribution to identify a best-fit line that defines an estimated position of the given mode line; and estimating the at least one stress-related characteristic of the IOX article using the estimated positions of the mode lines.

According to aspect (22), the method according to aspect (21) is provided, wherein the weighting function is a function of the pixel intensity values and places greater weight on those pixel intensity values that are closer to the extremum in the one-dimensional gray-scale intensity distribution as compared to those pixel intensity values that are farther from the extremum in the one-dimensional gray-scale intensity distribution.

According to aspect (23), the method according to aspect (22) is provided, wherein the weighting function comprises an exponential function.

According to aspect (24), the method according to any of aspects (21) to (23) is provided, wherein the at least one stress-related characteristic comprises at least one of: a stress profile, a knee stress, a center tension, a tension-strain energy, a birefringence, a spike depth, a depth of layer, and a refractive index profile.

According to aspect (25), the method according to any of aspects (21) to (24) is provided, further comprising removing any false mode lines by comparing the best-fit line to at least one expected mode line characteristic.

According to aspect (26), the method according to any of aspects (21) to (25) is provided, wherein the at least one expected mode line characteristic is selected from the group of mode line characteristics comprising: a position, a width, a variance with respect to an average tilt, a tilt angle and a tilt slope.

According to aspect (27), the method according to any of aspects (21) to (26) is provided, wherein the mode lines are tilted, and further comprising, prior to estimating the at least one stress-related characteristic of the IOX article: estimating an amount of tilt for each of the tilted mode lines; and rotating the mode spectrum by the negative of the amount of tilt to substantially remove the tilt from the mode lines.

According to aspect (28), the method according to aspect (27) is provided, wherein estimating the tilt angle for each of the tilted mode lines comprises: calculating a slope $\alpha$ for each of the mode lines as a fitting parameter to the best-fit line, wherein the slope $\alpha$ defines the amount of tilt.

According to aspect (29), the method according to any of aspects (27) to (28) is provided, wherein the capturing of the digital 2D mode spectrum is performed by a rotatable detector, and wherein the rotating of the mode spectrum is accomplished by rotating the rotatable detector.

According to aspect (30), the method according to aspect (29) is provided, wherein rotating the rotatable detector comprises performing a precision rotation of a rotatable stage the rotatably supports the rotatable detector.

According to aspect (31), the method according to aspect (29) is provided, wherein the rotating of the mode spectrum is accomplished by digitally rotating the digital 2D mode spectrum.

According to aspect (32), the method according to any of aspects (21) to (26) is provided, wherein the mode lines are tilted, and further comprising, prior to estimating the at least one stress-related characteristic of the IOX article: rotating the mode spectrum by the negative of a bias tilt to substantially remove the tilt from the mode lines, where the bias tilt is defined as an arithmetic mean of the tilt of the mode lines as measured for different IOX articles using the prism-coupling apparatus.

According to aspect (33), a prism coupling system for measuring at least one stress-related characteristic of an ion-exchanged (IOX) article having a waveguide region is provided. The prism-coupling system comprising: a light source system configured to generate input light along an input optical axis; a coupling prism configured to interface with the IOX article to define a coupling interface, wherein the input light is incident upon the coupling interface and reflects therefrom to form reflected light that exits the coupling prism and travels along an output optical axis, wherein the reflected light comprises a guided mode spectrum comprising mode lines with positions as defined by the waveguide region; a digital sensor comprising pixels and configured to detect the TM and TE guided mode spectra and form therefrom a two dimensional (2D) digital image of the TM and TE guided mode spectra; a controller configured to receive the 2D digital image of the TM and TE guided mode spectra, the controller having instructions stored in a non-transitory computer-readable medium that cause the controller to carry out the following acts: establishing for each mode line an amount of tilt; establishing from the amounts of tilt for the mode lines an average amount of tilt and a tilt variance; subtracting the average amount of tilt from the mode spectrum to define a tilt-compensated mode spectrum that has a reduced amount of tilt for each of the mode lines; and estimating the at least one stress-related characteristic of the IOX article using the tilt-compensated mode spectrum.

According to aspect (34), the prism-coupling system according to aspect (33) is provided, wherein the digital sensor is rotatable about the output optical axis, and wherein the act iii) of subtracting the average amount of tilt from the mode spectrum comprises rotating the digital sensor.

According to aspect (35), the prism-coupling system according to aspect (34) is provided, wherein the rotatable digital sensor is operably supported by a rotational drive system configured to rotate the digital sensor by a precision angular increment.

According to aspect (36), the prism-coupling system according to aspect (35) is provided, wherein the precision angular increment is in the range from 0.0026 radians to 0.0009 radians.

According to aspect (37), the prism-coupling system according to aspect (33) is provided, wherein the act iii) of subtracting the average amount of tilt from the mode spectrum comprises digitally rotating the 2D digital image.

According to aspect (38), the prism-coupling system according to any of aspects (33) to (37), wherein the act ii) of establishing from the amounts of tilt for the mode lines an average amount of tilt and a tilt variance comprises performing a running tilt average and a running tilt variance.

According to aspect (39), the prism-coupling system according to aspect (38) is provided, wherein the act iii) of subtracting the average amount of tilt from the mode spectrum is performed only when the running tilt average exceeds a threshold amount of tilt.

According to aspect (40), the prism-coupling system according to aspect (39) is provided, wherein the threshold amount of tilt is in the range from 0.006 radians to 0.001 radians.

According to aspect (41), a method of estimating positions of intensity transitions in a mode spectrum of an ion-exchanged (IOX) article is provided. The method comprising: calculating a derivative spectrum from the mode spectrum to form from the intensity transitions respective derivative intensity transitions; for each derivative intensity transition, determining a fitted line representative of a position of the derivative intensity transition, to define a set of fitted lines having respective positions in the mode spectrum; performing error checking on each fitted line in the set of fitted lines to assess whether the associated derivative intensity transition corresponds to a mode line or to noise in the mode spectrum and discarding any of the fitted lines found to be due to noise, thereby establishing a set of checked fitted lines; and defining the estimated positions of the intensity transitions in the mode spectrum as the respective positions of the set of checked fitted lines to define a corrected mode spectrum.

According to aspect (42), the method according to aspect (41) is provided, wherein the intensity transitions comprise mode lines and critical angle transitions, and wherein the derivative intensity transitions comprise derivative lines and derivative critical transition lines.

According to aspect (43), the method according to any of aspects (41) to (42) is provided, wherein the determining of the fitted line is performed using a weighted linear regression method.

According to aspect (44), the method according to aspect (43) is provided, wherein the weighted linear regression method utilizes an exponential weighting function for intensities in the derivative intensity transitions.

According to aspect (45), the method according to any of aspects (43) to (44) is provided, wherein the determining of the fitted line is performed using a two-layer weighted regression method.

According to aspect (46), the method according to aspect (45) is provided, wherein the two-layer weighted regression method comprises an exponential weighting function for the derivative intensity transitions.

According to aspect (47), the method according to any of aspects (41) to (46) is provided, wherein the intensity transitions have a length, and further comprising: averaging the mode spectrum in a direction that is along the length of the intensity transitions to form an averaged mode spectrum; and using the averaged mode spectrum to form the derivative spectrum.

According to aspect (48), the method according to any of aspects (41) to (47) is provided, wherein the calculating of the derivative spectrum utilizes a finite-difference method that includes performing an intensity normalization so that the derivative intensity transitions of the derivative spectrum are in the range between 0 and 1.

According to aspect (49), the method according to any of aspects (41) to (48) is provided, wherein the performing of the error checking comprises: comparing intensity values of candidate points of the fitted line to a threshold distance from the fitted line; and excluding those candidate points that exceed the threshold distance.

According to aspect (50), the method according to aspect (49) is provided, wherein the threshold distance is based on a standard deviation of distances between the candidate points used to form the fitted line, and the fitted line.

According to aspect (51), the method according to any of aspects (41) to (50) is provided, further comprising: using the corrected mode spectrum to estimate at least one stress-related characteristic of the IOX article.

According to aspect (52), a method of estimating a position of a critical angle intensity transition in a mode spectrum of an ion-exchange (IOX) article, comprising: a) calculating a derivative of the critical angle intensity transition to form a derivative critical transition line by taking the derivative of the original image of the mode spectrum; b) determining a fitted line to the derivative critical transition line; c) identifying an extremum of the fitted line as being representative of a position of the critical angle intensity transition in the mode spectrum.

According to aspect (53), the method according to aspect (52) is provided, wherein the mode spectrum includes a TM mode spectrum with a TM critical angle intensity transition and a TE mode spectrum with a TE critical angle intensity transition, and comprising: performing acts a) through c) for each of the TM critical angle transition and the TE critical angle transition to establish TM and TE critical angle transition positions in the mode spectrum; calculating a difference in the TM and TE critical angle positions; and using the difference in the TM and TE critical angle transition positions in the mode spectrum to calculate a knee stress in the IOX article.

According to aspect (54), a method of estimating positions of mode lines in a mode spectrum of an ion-exchange (IOX) article is provided. The method comprising: approximating for each mode line an initial position in the mode spectrum by locating an intensity extremum for the given mode line; calculating a derivative of the mode spectrum to define a derivative spectrum having derivative lines corresponding to the mode lines and each having an intensity transition; and for each mode line, determining a fitted line thereto by performing a weighted least squares fit using the initial position of the mode line and the intensity transition of the mode line, to define a set of fitted lines having respective positions in the mode spectrum, wherein the respective positions of the fitted lines serve as the estimated positions of the mode lines in the mode spectrum.

According to aspect (55), the method according to aspect (54) is provided, wherein the mode lines comprise TE mode lines and TM mode lines further comprising: using the respective positions of the set of fitted mode lines to estimate at least one stress-related characteristic of the IOX article.

According to aspect (56), the method according to any of aspects (54) to (55) is provided, further comprising: averaging the mode spectrum in a direction that is along a length of the mode lines to form an averaged mode spectrum; and using the averaged mode spectrum for the locating of the intensity extremum for each mode line and for the calculating of the derivative spectrum.

According to aspect (57), the method according to any of aspects (54) to (56) is provided, wherein the weighted least squares fit comprises a weighting function that depends on a difference between the intensity extremum and the intensity transition.

According to aspect (58), the method according to aspect (57) is provided, wherein the weighting function comprises an exponential function.

According to aspect (59), the method according to any of aspects (54) to (58) is provided, further comprising performing error checking by: for each mode line, comparing intensity values of candidate points of the fitted line for the mode line to a threshold distance from the fitted line; and excluding those candidate points that exceed the threshold distance.

According to aspect (60), the method according to aspect (59) is provided, wherein the threshold distance is based on a standard deviation of distances between the candidate points used to form the fitted line, and the fitted line.

Additional features and advantages are set forth in the Detailed Description that follows, and in part will be apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide further understanding, and are incorporated in and constitute a part of this specification. The drawings illustrate one or more embodiment(s), and together with the Detailed Description explain the principles and operation of the various embodiments. As such, the disclosure will become more fully understood from the following Detailed Description, taken in conjunction with the accompanying Figures, in which:

FIGS. 12A and 12B are schematic depictions of measured mode spectra having tilted mode lines, wherein FIG. 12B shows the mode spectra rotated in the opposite direction of the average tilt angle $φ_A$ of the mode lines so that the mode lines are oriented substantially vertically, i.e., without a substantial amount of tilt (e.g., with a residual tilt $φ_A$~0).

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

Cartesian coordinates are used in some Figures for the sake of reference and are not intended to be limiting as to direction and/or orientation.

The abbreviation μm stands for micron or micrometer, which is $10^{-6}$ meter.

The abbreviation nm stands for nanometer, which is $10^{-9}$ meter.

The acronym IOX can mean either "ion exchange" or "ion exchanged," depending on the context of the discussion. An "IOX article" means an article formed using at least one IOX process. Thus, an article formed by a DIOX (double IOX) process is referred to herein as an IOX article, though it could also be referred to as a DIOX article.

The term "glass based" is used herein to describe a material, article, matrix, substrate, etc., and means that the material, article, matrix, material, substrate, etc. can comprise or consist of either a glass, glass crystal or a glass ceramic.

Figure 1A:
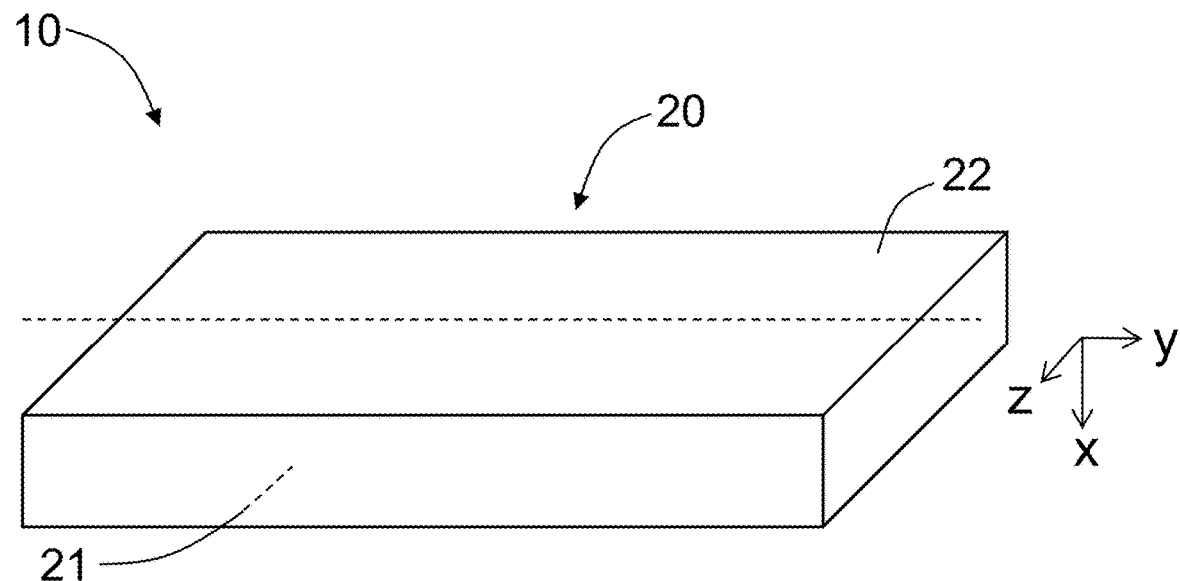
FIG. 1A is an elevated view of an example IOX article comprising a planar glass substrate.
Figure 1B:
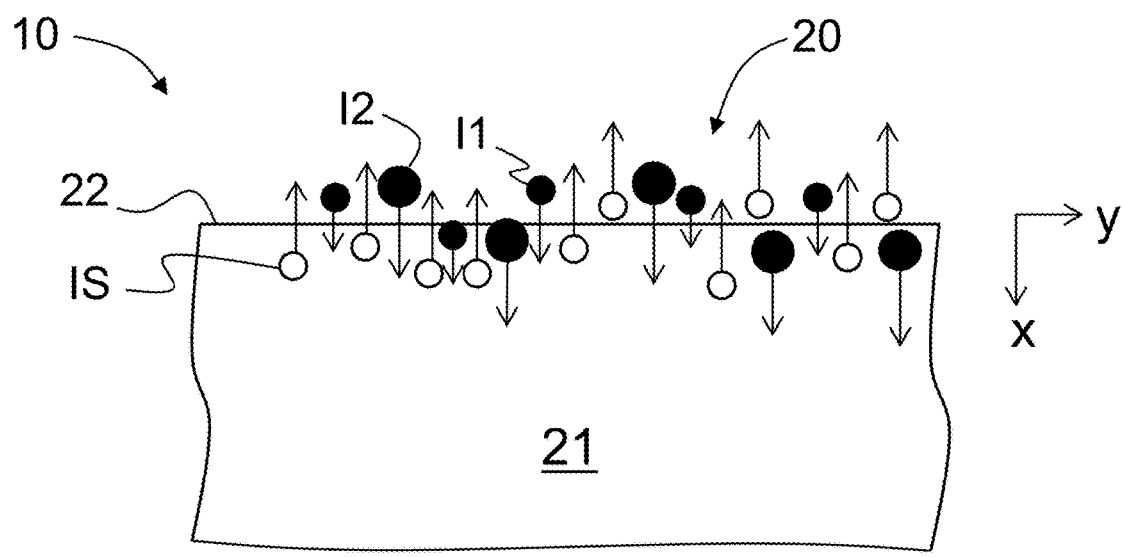
FIG. 1B is a close-up cross-sectional view of the IOX article of FIG. 1A as taken in the x-y plane and that illustrates an example IOX process that takes place across the substrate surface and into the body of the substrate.
Figure 1C:
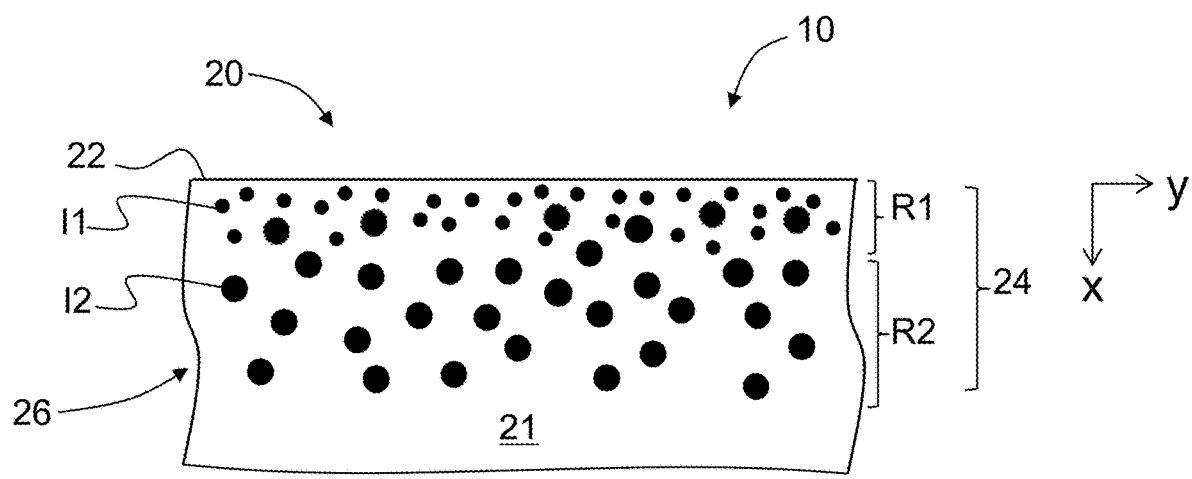
FIG. 1C schematically illustrates the result of the IOX process that forms the IOX article of FIGS. 1A and 1B, which has a near-surface spike region (R1) and a deep region (R2).

The glass substrate and IOX article is shown in FIGS. 1A, 1B and 1C with spatial x-y-z Cartesian coordinates, where x is the direction into the body of the IOX article.

The compressive stress profile for an IOX article is denoted $CS(x)$ and is also referred to herein as just the stress profile. The surface compressive stress or just "surface stress" for the stress profile is denoted CS and is the value of the compressive stress profile $CS(x)$ for x=0, i.e., CS=CS(0), where x=0 corresponds to the surface of the IOX article.

The depth of compression DOC is the x distance into the IOX article as measured from the surface of the IOX article where the compressive stress $CS(x)$ or $CS'(x)$ crosses zero.

The knee stress is denoted $CS_k$ and is the amount of compressive stress at a knee transition point (depth D1) between a spike region (R1) and a deep region (R2), i.e., $CS(D1)=CS_k$.

The spike region R1 has a spike depth from the substrate surface that is denoted both as D1 and $DOL_{SP}$, with the latter also being referred to as the spike depth of layer. The spike region is also referred as a "near-surface spike region" to clarify the distinction with the deep region.

The deep region R2 has a depth D2 which is also denoted as the total depth of layer $DOL_T$ for the total IOX region.

A "mode spectrum" comprises both a transverse magnetic (TM) mode spectrum having TM mode lines and a transverse electric (TE) mode spectrum having TE mode lines. Mode lines are also referred to in the art as "fringes." The mode spectrum can be said to comprise intensity transitions constituted by both mode lines and by critical angle transitions, i.e., where the coupling angle θ changes to a critical angle $δ_C$ associated with light being coupled into the waveguide of the IOX substrate and traveling therein as a guided mode.

A "compensated mode spectrum" or "corrected mode spectrum" or "improved mode spectrum" is a mode spectrum whereby the positions and/or orientations of the intensity variations in the mode spectrum are defined using the methods disclosed herein, and can include the fitted mode lines with any tilt substantially removed, and can include defining the positions of the intensity variations using the derivative-based methods disclosed herein.

Figure 4A:
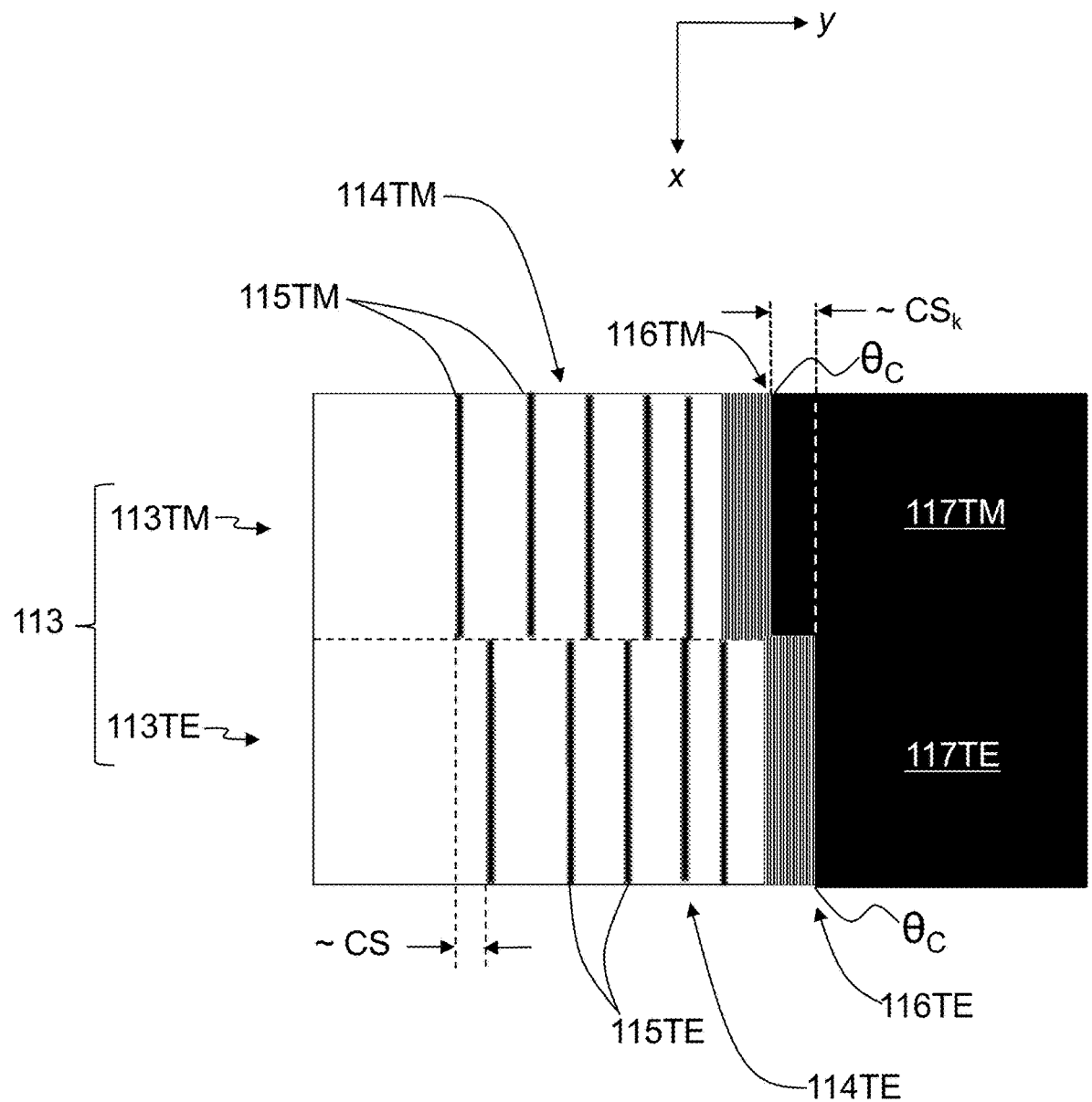
FIG. 4A is a schematic representation of an idealized 2D mode spectrum (mode spectrum image) that includes TM and TE mode spectra as captured by the photodetector system of FIG. 3B in an ideal prism-coupling system, wherein the intensity variations appear as dark features on a light (bright) background.
Figure 4B:
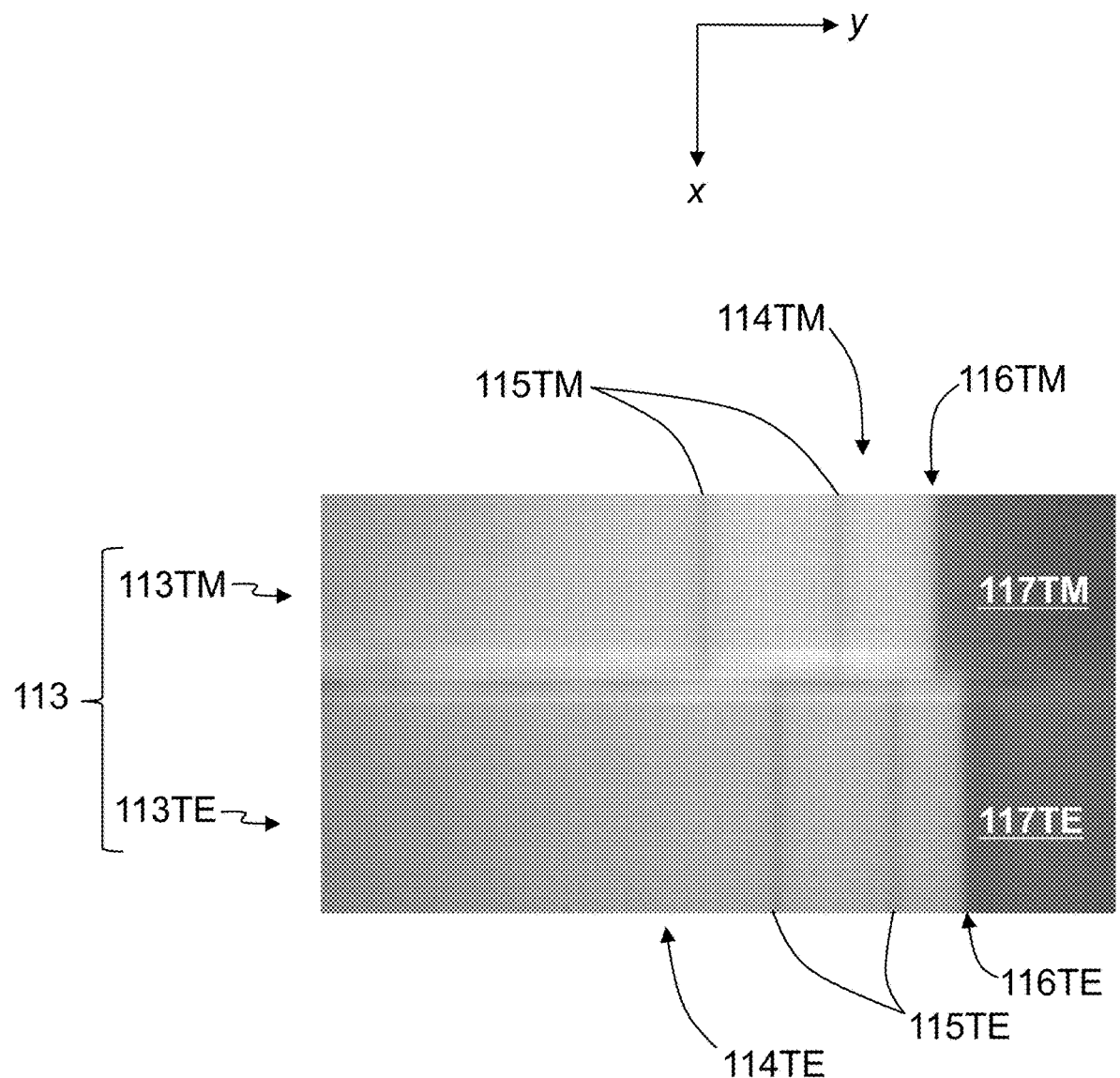
FIG. 4B is a picture of an example captured 2D mode spectrum image using the prism coupling system of FIG. 3A, showing intensity variations in the form of mode lines and critical angle transitions.
Figure 4C:
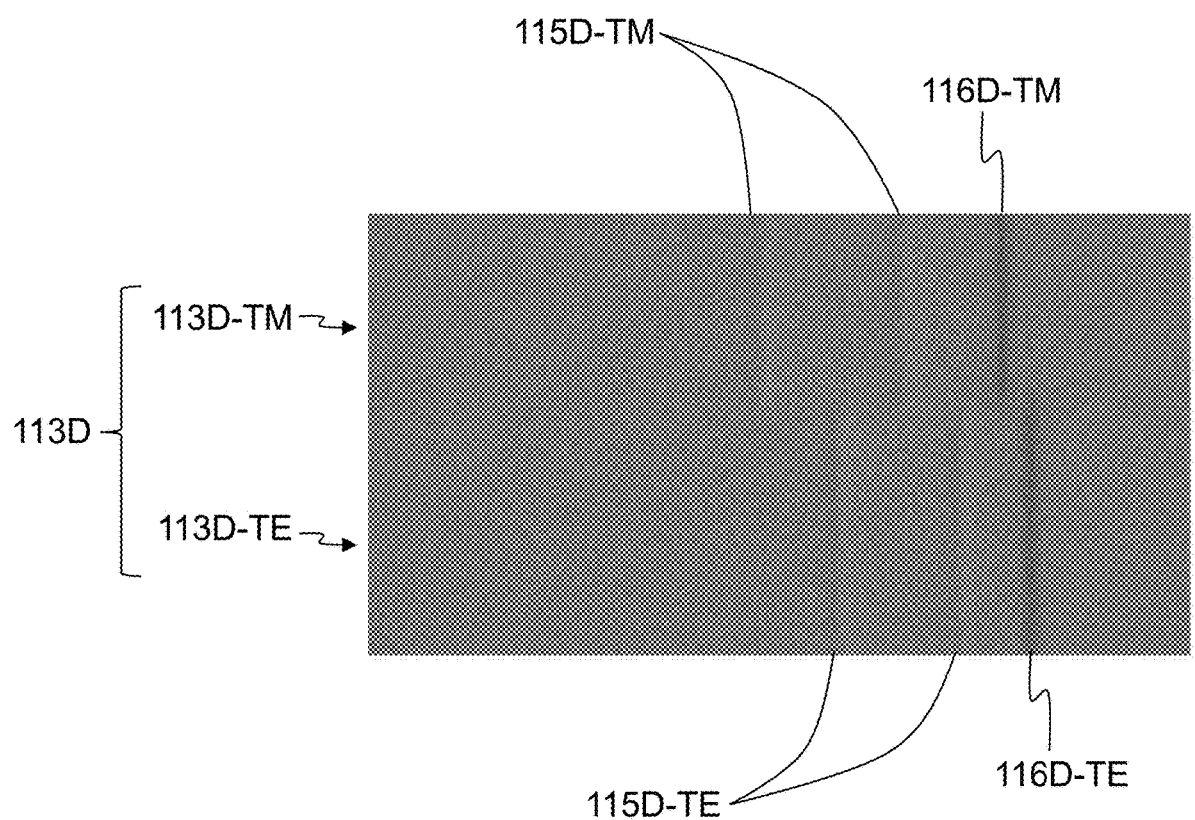
FIG. 4C is a derivative spectrum as calculated from the example mode spectrum of FIG. 4B and illustrating derivative intensity variations in the form of derivative lines and derivative critical transition lines.

The tilt angle of an individual mode line is denoted φ and is measured relative to the x-direction of local x-y Cartesian coordinates, as shown in FIG. 4C. A tilt angle φ measured counterclockwise from the x-direction is positive and a tilt angle φ measured clockwise from the x direction is negative. The slope or rotation of an individual mode line is α=tan(φ), and for small tilt angles, α≈φ.

The term "tilt" refers to a rotation of a mode line relative to an ideal orientation of the mode line, which in the local coordinate system is in the x-direction. The tilt can be measured using either the tilt angle or the slope, noting that these two measurements can be substantially the same for small angles as noted immediately above.

The average slope is denoted $\bar{α}$ and is an average or arithmetic mean of all the slopes of all the mode lines in a given mode spectrum, i.e., of both the TM and TE mode spectra, as calculated by adding all of the slopes and dividing by the total number of slopes added. The variance in the slope is denoted v while the average variance is denoted $\bar{v}$. The variance is calculated as a standard deviation unless otherwise noted.

The bias slope is denoted $a_B$ and is the arithmetic average or mean of all the slopes measured for the mode spectra of different IOX articles using a single prism-coupling apparatus. Thus, the bias slope $α_B$ can be considered a property of the given prism-coupling apparatus that reflects the propensity of the given prism-coupling apparatus to have tilted mode spectra. The bias tilt variance (or just tilt variance) is a measure of the spread in the distribution of the slope measurements used to calculate the bias slope, and is measured as a standard deviation unless otherwise stated.

The tilt bias describes the propensity of a prism-coupling system to generate mode spectra having tilted mode lines. The tilt bias variance describes the degree of consistency or inconsistency in the tilt bias.

The claims as set forth below are incorporated into and constitute part of this Detailed Description.

Example prism-coupling systems and measurement methods are described for example in: U.S. Pat. No. 10,180,416, issued Jan. 15, 2019, entitled "METHODS OF CHARACTERIZING ION-EXCHANGED CHEMICALLY STRENGTHENED GLASSES CONTAINING LITHIUM (also published as U.S. Patent Application Publication No. 2016/0356760 and WO 2016/196748 A1); U.S. Pat. No. 9,897,574, issued Feb. 20, 2018, entitled "METHODS OF CHARACTERIZING ION-EXCHANGED CHEMICALLY STRENGTHENED GLASSES CONTAINING LITHIUM"; and U.S. Pat. No. 10,900,850, issued Jan. 26, 2021, entitled "METHODS OF IMPROVING THE MEASUREMENT OF KNEE STRESS IN ION-EXCHANGED CHEMICALLY STRENGTHENED GLASSES CONTAINING LITHIUM," (also published as U.S. Patent Application Publication No. 2019/0033144); U.S. Pat. No. 9,534,981, issued Jan. 3, 2017, "PRISM-COUPLING SYSTEMS AND METHODS FOR CHARACTERIZING ION-EXCHANGE WAVEGUIDES WITH LARGE DEPTH-OF-LAYER;" and U.S. Pat. No. 10,732,059, issued Aug. 4, 2020, entitled "PRISM-COUPLING STRESS METER WITH WIDE METROLOGY PROCESS WINDOW," (also published as U.S. Patent Application Publication No. 2019/0301952) are all incorporated by reference herein.

IOX Article

FIG. 1A is an elevated view an example IOX article 10. The IOX article 10 comprises a glass-based substrate 20 having a matrix 21 that defines a (top) surface 22, wherein the matrix has a base (bulk) refractive index $n_S$ and a surface refractive index $n_0$. FIG. 1B is a close-up cross-sectional view of the IOX article 10 as taken in the x-y plane and illustrates an example IOX process that takes place across the surface 22 and into the matrix 21 in the x-direction to form the example IOX article.

With reference to FIG. 1B, the glass-based substrate 20 includes in the matrix 21 substrate ions IS, which exchange for first ions I1 and second ions I2. The first and second ions I1 and I2 can be introduced into the matrix 21 either sequentially or concurrently using known techniques. For example, second ions I2 can be r ions introduced via a $KNO_3$ bath for strengthening, prior to introducing first ions I1 that can be $Ag^+$ ions introduced via a $AgNO_3$-containing bath to add an anti-microbial property adjacent surface 22. The circles in FIG. 1B that represent ions I1 and I2 are used for schematic illustration only, and their relative sizes do not necessarily represent any actual relationship between the sizes of the actual ions participating in the ion exchange. FIG. 1C schematically illustrates the result of a IOX process that forms the IOX article 10, wherein the substrate ions IS are omitted in FIG. 1C for ease of illustration and are understood as constituting the matrix 21. The IOX process forms an IOX region 24 that includes a near-surface spike region R1 and a deep region R2, as explained below. The IOX region 24 defines an optical waveguide 26.

In addition, ions I1 may be present in significant numbers in both regions R1 and R2 (see FIG. 2, introduced and discussed below) as may be ions of type I2. Even with a one-step ion-exchange process it is possible to observe the formation of two IOX regions R1 and R2, with significant differences in the relative concentrations of ions I1 and I2. In an example, using an ion exchange of Na-containing or Li-containing glass in a bath containing a mixture of $KNO_3$ and $AgNO_3$, it is possible to obtain the spike region R1 with significant concentrations of both $Ag^+$ and $K^+$, and the deep region R2 also with significant concentrations of $Ag^+$ and $K^+$, but the relative concentration of $Ag^+$ with respect to $K^+$ may be significantly larger in the spike region R1 than in the deep region R2.

Figure 1D:
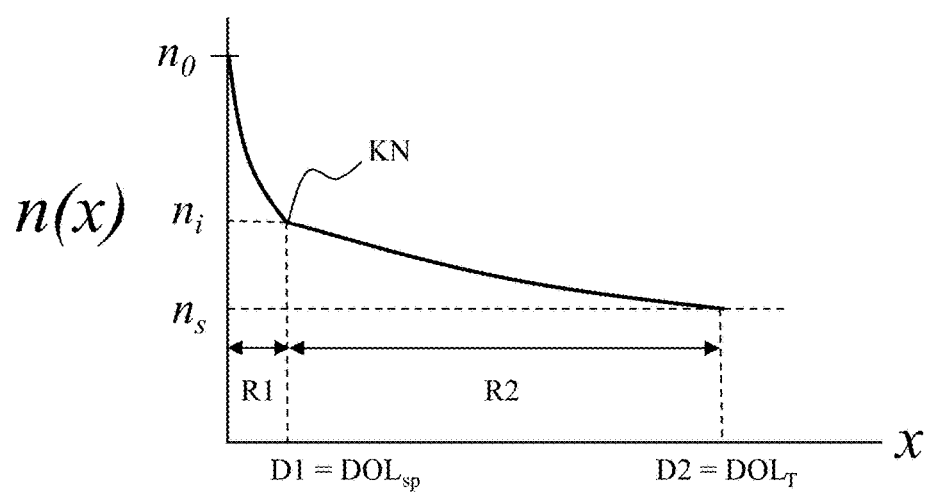
FIG. 1D is a representation of an example refractive index profile n(x) for the IOX article illustrated in FIGS. 1A through 1C.

FIG. 1D is a representation of an example refractive index profile n(x) for an example IOX article 10, such as illustrated in FIG. 1C, and showing the spike region R1 associated with the shallower ion-exchange (ions I1) and that has a depth D1 (or $DOL_{SP}$) into the matrix 21. The deep region R2 associated with the deeper ion-exchange (ions I2) and has a depth D2 that defines the total depth-of-layer ($DOL_T$). In an example, the total $DOL_T$ is at least 50 μm and further in an example can be as large as 150 μm or 200 μm. The transition between the spike region R1 and the deep region R2 defines a knee KN in the refractive index profile n(x) and also in the corresponding stress profile CS(x), as described below.

The deep region R2 may be produced in practice prior to the spike region R1. The spike region R1 is immediately adjacent the substrate surface 22 and is relatively steep and shallow (e.g., D1 is a few microns), whereas the deep region R2 is less steep and extends relatively deep into the substrate to the aforementioned depth D2. In an example, the spike region R1 has a maximum refractive index $n_0$ at substrate surface 22 and steeply tapers off to an intermediate index $n_i$ (which could also be called the "knee index"), while the deep region R2 tapers more gradually from the intermediate index down to the substrate (bulk) refractive index $n_S$. It is emphasized here that other IOX processes can result in a steep and shallow near-surface refractive index change and that a DIOX process is discussed here by way of illustration.

Figure 2A:
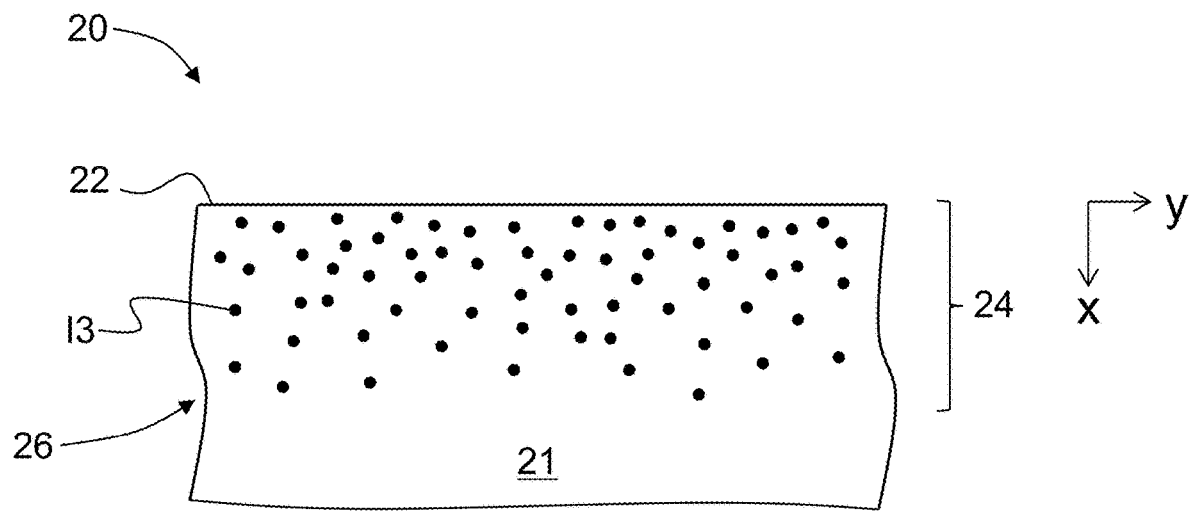
FIG. 2A is similar to FIG. 1C and illustrates an example IOX article formed using a single exchange ion species.
Figure 2B:
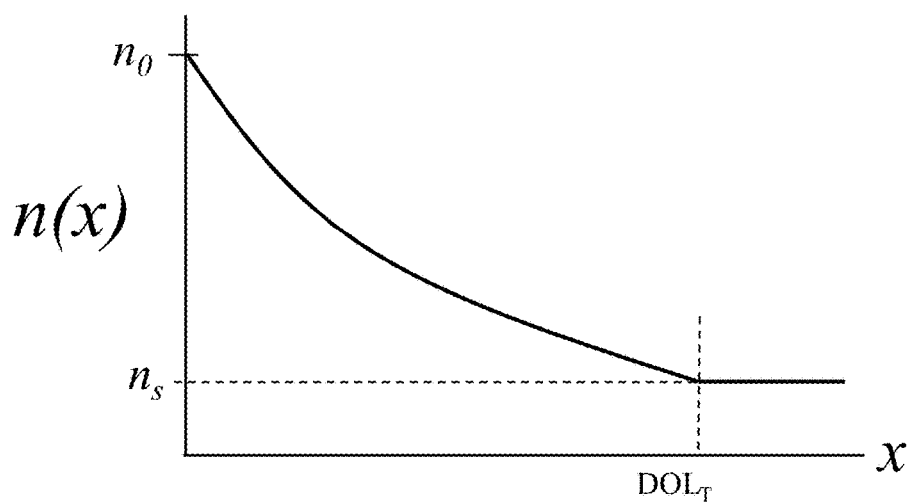
FIG. 2B is similar to FIG. 1D and a representation of an example refractive index profile n(x) for the IOX article of FIG. 2A.

FIG. 2A is similar to FIG. 1C and illustrates an example IOX process that uses a single exchange ion 13 to form the IOX article 10. FIG. 2B is similar to FIG. 1D and a representation of an example refractive index profile n(x) for the IOX article 10 of FIG. 2A. The example refractive index profile n(x) smoothly transitions from the relatively high surface refractive index $n_0$ down to the substrate or bulk refractive index $n_S$ of the matrix 21. The optical waveguide 26 (also referred to herein as a waveguide region) is thus defined by the IOX region 24 having a gradient distribution of the ion 13 in the glass matrix from the surface 22 into the matrix 21 in the x-direction.

Prism-Coupling System

Figure 3A:
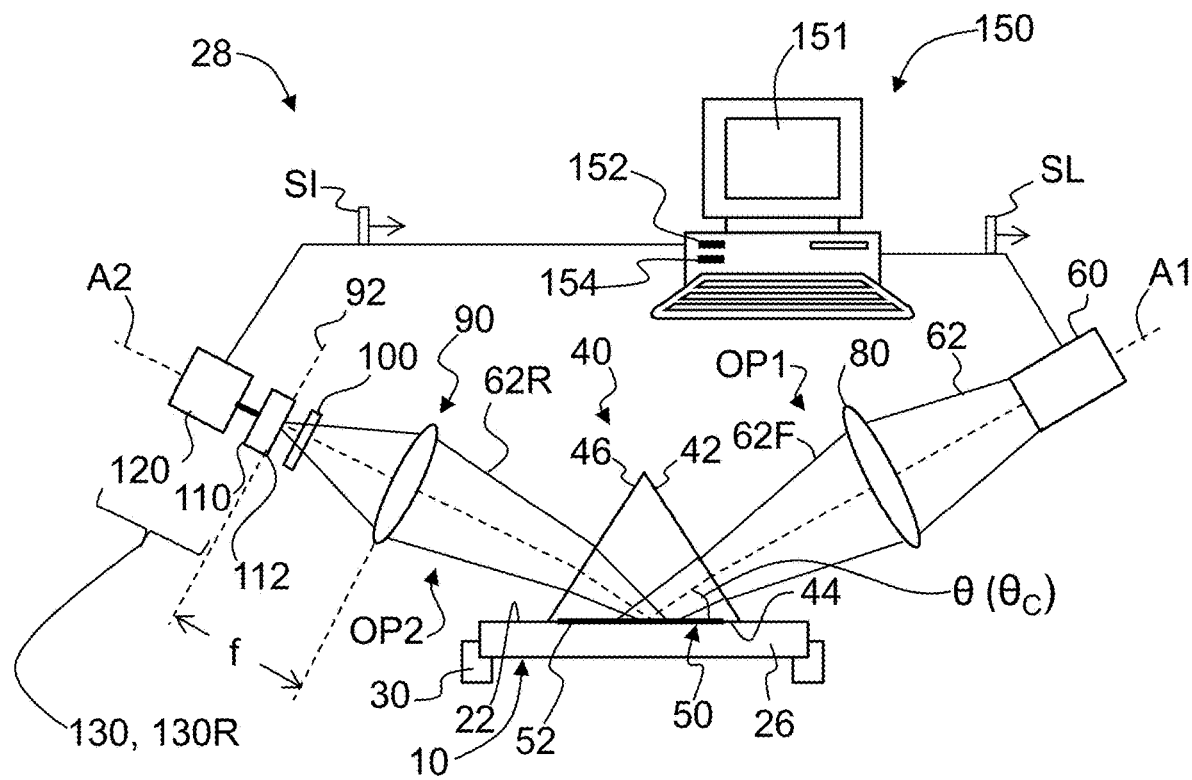
FIG. 3A is a schematic diagram of an example prism-coupling system according to the disclosure and that is used to measure IOX articles using the methods disclosed herein.

FIG. 3A is a schematic diagram of an example prism-coupling system 28 that can be used to carry out aspects of the methods disclosed herein. The prism coupling methods using the prism-coupling system 28 are non-destructive. This feature is particularly useful for measuring frangible IOX articles for research and development purposes and for quality control in manufacturing.

The prism-coupling system 28 includes a support stage 30 configured to operably support the IOX article 10. The prism-coupling system 28 also includes a coupling prism 40 that has an input surface 42, a coupling surface 44 and an output surface 46. The coupling prism 40 has a refractive index $n_p > n_0$. The coupling prism 40 is interfaced with the IOX article 10 being measured by bringing the coupling-prism coupling surface 44 and the surface 22 into optical contact, thereby defining a coupling interface 50 that in an example can include an interfacing (or index-matching) fluid 52.

The prism-coupling system 28 includes input and output optical axes A1 and A2 that respectively pass through the input and output surfaces 42 and 46 of the coupling prism 40 to generally converge at the coupling interface 50 after accounting for refraction at the prism/air interfaces.

The prism-coupling system 28 includes, in order along the input optical axis A1, a light source system 60 that emits measurement light 62 in the general direction along the input optical axis A1. A focusing optical system 80 resides between the coupling prism 40 and the light source system 60 and is used to focus the measurement light to form focused light 62F that passes through the input surface 42 and is incident upon the coupling surface 44 of the coupling prism 40 and the coupling interface 50.

The prism-coupling system 28 also includes, in order along the output optical axis A2 from the coupling prism 40, a collection optical system 90 having a focal plane 92 and a focal length f and that receives reflected light 62R as explained below, a TM/TE polarizer 100, and a photodetector system 130.

The input optical axis A1 defines the center of an input optical path OP1 between the light source system 60 and the coupling surface 44. The input optical axis A1 also defines a coupling angle θ with respect to the surface 22 of the IOX article 10 being measured.

The output optical axis A2 defines the center of an output optical path OP2 between the coupling surface 44 and the photodetector system 130. Note that the input and output optical axes A1 and A2 may be bent at the input and output surfaces 42 and 46, respectively, due to refraction. They may also be broken into sub-paths by inserting mirrors (not shown) into the input and output optical paths OP1 and/or OP2.

Figure 3B:
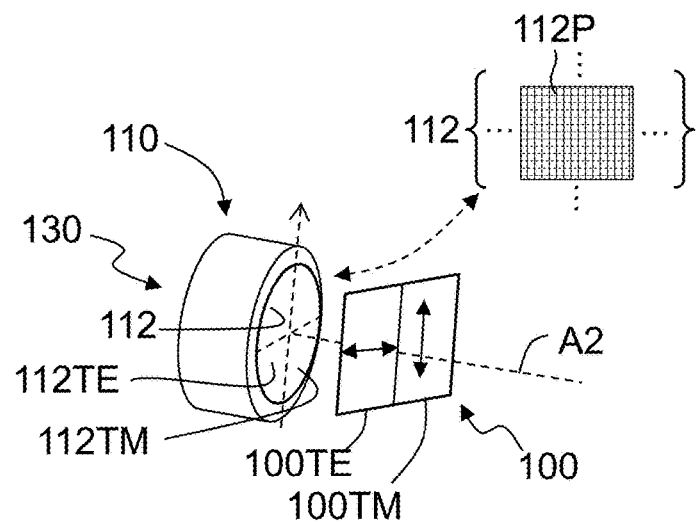
FIG. 3B is a close-up view of the photodetector system of the prism-coupling system of FIG. 3A.

In an example, the photodetector system 130 includes a detector (camera) 110 and a frame grabber 120. In other embodiments discussed below, the photodetector system 130 includes a CMOS or CCD camera. FIG. 3B is a close-up elevated view of the TM/TE polarizer 100 and the detector 110 of the photodetector system 130. In an example, the TM/TE polarizer includes a TM section 100TM and a TE section 100TE. The photodetector system 130 includes a photosensitive surface 112.

The photosensitive surface 112 resides in the focal plane 92 of the collection optical system 90, with the photosensitive surface being generally perpendicular to the output optical axis A2. This serves to convert the angular distribution of the reflected light 62R exiting the coupling prism output surface 46 to a transverse spatial distribution of light at the sensor plane of the detector 110. In an example embodiment, the photosensitive surface 112 comprises pixels 112P, as shown in the close-up inset of FIG. 3B. In an example, the detector 110 is a digital detector, e.g., a digital camera, CMOS, sensor, etc.

Splitting the photosensitive surface 112 into TE and TM sections 112TE and 112TM as shown in FIG. 3B allows for the simultaneous recording of digital images of the two-dimensional (2D) angular reflection spectrum (mode spectrum) 113, which includes the individual TE and TM mode spectra 113TE and 113TM for the TE and TM polarizations of the reflected light 62R. This simultaneous detection eliminates a source of measurement noise that could arise from making the TE and TM measurements at different times, given that system parameters can drift with time. The digital image captured in this manner is also referred to below as the "original image" or "mode spectrum image."

Figure 3C:
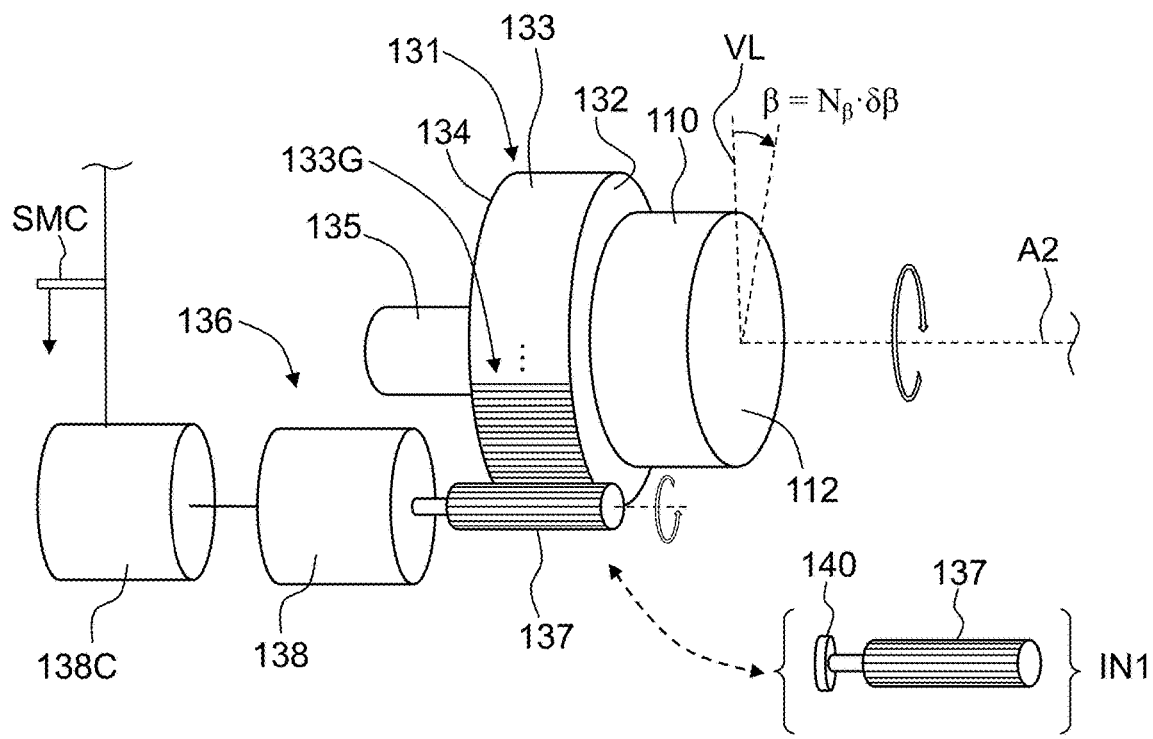
FIG. 3C is a close-up elevated view of a photodetector system that shows the detector supported by a rotatable support stage that is driven by a rotational drive system to perform a precise amount of rotation of the detector about the output optical axis of the prism-coupling system.

FIG. 3C is a close-up elevated view of the detector 110 shown operably supported by a rotatable support stage 131 having a front side 132, a perimeter 133 and a back side 134. The detector 110 is shown supported at the front side 132 and is shown as having an angular orientation $\beta = N_\beta \cdot \delta\beta$ relative to a vertical reference line VL, wherein $\delta\beta$ is a rotational increment and $N_\beta$ is a number of rotational angular increments. The rotatable support stage 131 can be supported by a support shaft 135 at the back side 134. The rotatable support stage 131 is configured to be rotatable about the output optical axis A2 so that the detector 110 and its photosensitive surface 112 can be rotated relative to the output optical axis. In an example, the rotatable support stage 131 is operably connected to a rotational drive system 136. In one example, the rotational drive system 136 comprises a first drive gear 137 operably attached to a rotational drive motor 138 that rotationally drives the first drive gear. The rotational drive motor 138 is operably connected to a motor controller 138C that controls the operation of the rotational drive motor.

In an example, the first drive gear 137 engages grooves 133G on the perimeter 133 of the rotatable support stage 131 to cause the rotation of the rotatable support stage when the rotational drive motor 138 drives the first drive gear 137. In an example, the rotational drive motor 138 is a precision motor that can rotate the first drive gear 137 in small, precise rotational increments $\delta\beta$ under the control of the motor controller 138C so that the photosensitive surface 112 of the detector 110 is rotated in a number $N_\beta$ of the small, precise rotational increments $\delta\beta$ to a select angular orientation $\beta = N_\beta \cdot \delta\beta$. In an example, the rotational drive motor 138 comprises a commercially available rotary piezo motor or like high-resolution rotary positioner.

In an alternative embodiment shown in the close-up inset IN1, the rotational drive motor 138 can be replaced by a manual precision drive member 140, such as a fine drive screw, a fine worm gear a worm gear combined with a differential micrometer. In an example, the angular increments $\delta\beta$ can be in the range from 0.15 degrees to 0.05 degrees.

Figure 3D:
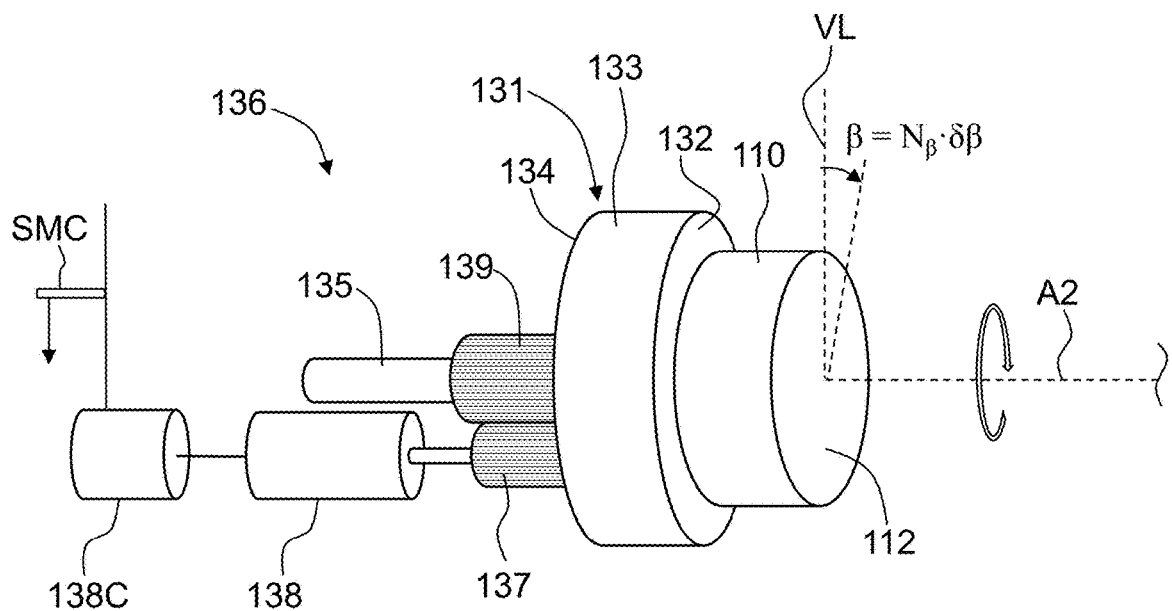
FIG. 3D is similar to FIG. 3C and shows an alternate arrangement of the rotational drive system.

FIG. 3D is similar to FIG. 3C and illustrates an alternate arrangement of the rotational drive system 136, wherein the support shaft 135 comprises a second drive gear 139 that engages the first drive gear 137 to cause rotation of the rotatable support stage 131 and thus the detector 110. The photodetector system 130 that includes the rotatable support stage 131 and the rotational drive system 136 comprises a rotatable photodetector system 130R.

With continuing reference to FIG. 3A, the prism-coupling system 28 includes a controller 150, which is configured to control the operation of the prism-coupling system. The controller 150 is also configured to receive and process from the photodetector system 130 image signals SI representative of captured (detected) original image, i.e., the TE and TM mode spectra 113. The controller 150 includes a display 151, a processor 152 and a memory unit ("memory") 154. The controller 150 may control the activation and operation of the light source system 60 via a light-source control signal SL, and receives and processes image signals SI from the photodetector system 130 (e.g., from the frame grabber 120, as shown). In an example, the motor controller 138C is controlled by the controller 150 via a motor controller signal SMC to initiate rotation of the detector 110 for reasons explained in greater detail below.

The controller 150 is programmable (e.g., with instructions embodied in a non-transitory computer-readable medium) to perform the functions described herein, including the operation of the prism-coupling system 28 and to perform signal processing of the image signals SI to arrive at a measurement of one or more of the aforementioned stress characteristics of the IOX article 10. In addition, the controller is configured to carry out the methods described herein for determining mode line locations and for removing any tilt of the mode lines 115TM and 115TE (see FIGS. 4A, 4B introduced and discussed immediately below).

Mode Spectrum

FIG. 4A is a schematic representation of an idealized mode spectrum 113 as captured by the photodetector system 130. FIG. 4B is an actual mode spectrum 113 captured by the photodetector system 130. The local Cartesian coordinates are x and y. The mode spectrum 113 has TM and TE total-internal-reflection (TIR) sections 114TM and 114TE respectively associated with TM and TE guided modes, and non-TIR sections 117TM and 117TE respectively associated with TM and TE radiation modes and leaky modes. The TIR section 114TM includes one or more TM mode lines 115TM while the TIR section 114TE includes one or more TE mode lines 115TE. The TM and TE mode lines 115TM and 115TE are generally aligned in the x direction and are spaced apart in they direction.

The measured TM mode spectrum 113TM has a discrete 2D intensity distribution $I_{TM}(x,y)$ while the TE mode spectrum 113TE has a discrete 2D intensity distribution $I_{TE}(x,y)$, with the discreteness being due to the digital capture of the mode spectrum 113 using a detector 110 comprising a two-dimensional array of pixels 112P.

Transitions 116TM and 116TE between the TIR section 114TM, 114TE and the non-TIR sections 117TM, 117TE define a critical angle for the optical coupling into and out of the optical waveguide 26 of the IOX article 10 and is referred to as the critical angle transition 116. The difference in locations of the start of the critical angle transitions 116TM and 116TE for the TM and TE mode spectra 113TM and 113TE is proportional to the knee stress $CS_k$ and this proportionality is indicated by "~$CS_k$" in FIG. 4A.

The mode lines 115 and the critical angle transitions 116 each constitute a type of intensity transition in the mode spectrum 113. Thus, in the description below, reference to an "intensity transition" in the mode spectrum 113 can mean either a mode line 115 or a critical angle transition 116 unless otherwise noted.

The TM and TE mode lines 115TM and 115TE can either be bright lines or dark lines, depending on the configuration of the prism-coupling system 28. Likewise, the critical angle transitions 116TM and 116TE can be a transition from bright to dark or from dark to bright, depending on the configuration of the prism-coupling system 28.

In FIG. 4A and in the other mode spectra discussed below and shown in the other Figures, the TM and TE mode lines 115TM and 115TE are shown as dark lines for ease of illustration, and the corresponding critical angle transitions 116TM and 116TE are shown as an intensity transition from bright to dark.

In FIG. 4B, the TM and TE mode lines 115TM and 115TE are also dark but the contrast of the mode lines is not particularly high, making it difficult to determine exactly where the TM and TE mode lines reside. The various systems and methods disclosed herein are directed to determining positions of the TM and TE mode lines 115TM and 115TE with improved accuracy so that the resulting calculations of the characteristics of the IOX article 10 are more accurate.

The stress characteristics are calculated based on the difference in the x positions of the TM and TE mode lines 115TM and 115TE in the mode spectrum 113. The birefringence B is the difference between the effective indices of the TM and TE polarizations, wherein the effective indices are represented by the y positions of the mode lines. The surface compressive stress CS, or the depth of compression, is computed by the y distances between the mode lines (effective indices) and the ratio B/SOC, where SOC is the stress optic coefficient. At least two TM and TE mode lines 115TM and 115TE are needed to calculate the surface stress CS. Additional mode lines are needed to calculate the compressive stress profile CS(x). The depth of layer $DOL_T$ is a measure of stress penetration or ion penetration length into the matrix 21 of the glass-based substrate 20, and in the case of an IOX process, can also be calculated by the locations and number of the TM and TE mode lines 115TM and 115TE. The TM and TE mode line locations (positions) along the x axis are thus the most basic measurement for inferring stress-related characteristics of the IOX article 10.

Derivative-Based Method

In example method, referred to herein as the "derivative-based method," involves determining the positions of the TM and TE mode lines 115TM and 115TE by detecting intensity transitions in each of the mode lines in the derivative images (the normalized derivative of the original gray level intensity represented as an image). Specifically, the exact place where a transition happens is where the rate of change in the gray level intensity of the spectrum (or image) is at an extremum, which is an intensity maximum for bright lines and an intensity minimum for dark lines.

FIG. 4C is the derivative of the mode spectrum 113 of FIG. 4B and is referred to herein as the "derivative spectrum" 113D having "derivative intensity transitions" constituted by "derivative lines" 115D and "derivative critical transition lines" 116D. In particular, the derivative spectrum 113D has a TM section 113D-TM with "TM derivative intensity transitions" constituted by "TM derivative lines" 115D-TM and a "TM derivative critical transition line" 116D-TM. The derivative spectrum 113D also has a TE section 113D-TE with "TE derivative intensity transitions" constituted by "TE derivative lines" 115D-TE and a "TE derivative critical transition line" 116D-TE. The derivative spectrum 113D is calculated numerically from the mode spectrum 113 of FIG. 4B using the numerical methods discussed below.

The TM and TE derivative lines 115D of the derivative spectrum 113D are representations of the TM and TE mode lines 115TM and 115TE in "derivative space." In the derivative space, each pixel has an intensity value which is proportional to the derivatives of the original image gray level intensity and the derivative intensity transitions are represented as the darkest/brightest pixels. The term "derivative line" is used herein as shorthand for the rate of change of the mode line intensity with a position associated with an actual mode line. A derivative line is not a line in the original image (mode spectrum) but becomes a "line" in the derivative space that represents the rate of change in the gray level intensity. The intensity can be a full range of gray-scale pixel intensities, e.g., 0 to 255, or normalized from 0 to 1 in increments of $\frac{1}{256}$. Likewise, the term "derivative critical transition line" is used herein as shorthand for the rate of change of the critical angle intensity with a position associated with the critical angle transition in the mode spectrum. A derivative critical transition line is not a line in the original image (mode spectrum); rather, it is the place where the original image transisitions from bright to dark, i.e., is an intensity "edge" that becomes a "line" in the derivative space.

Analyzing the derivative intensity transitions in the derivative spectrum 113D makes it easier to estimate the actual locations of intensity transitions in the mode spectrum 113, as compared to trying to detect the intensity transitions directly in the "image space" of the captured mode spectrum 113.

The derivative spectrum 113D can be calculated from the mode spectrum 113 as follows. First, it is assumed that the gray level intensity at row i, column j of the digital image of the mode spectrum 113 is $p_{ij}$, and that there are a total of m columns of pixels, and the distance between each pixel in the horizontal axis is $\Delta h$. The derivative $d_{ij}$ of the gray level intensity with respect to the horizontal axis/column, at row i, column j, can be expressed as a finite difference formula:

$$d_{ij} = \begin{cases} \frac{p_{i2} - p_{i1}}{\Delta h} & j = 1 \\ \frac{p_{i(j+1)} - p_{i(j-1)}}{2\Delta h} & j = 2, 3 \ldots m - 1 \\ \frac{p_{im} - p_{i(m-1)}}{\Delta h} & j = m \end{cases} \quad (1A)$$

To plot the derivative intensity transitions to create a derivative spectrum 113D such as shown in FIG. 4C, the derivatives are normalized so that the values of the derivatives are between 0 and 1, i.e., $$\overline{d_{ij}} = \frac{d_{ij} - \min(d_{ij})}{\max(d_{ij}) - \min(d_{ij})} \quad (2A)$$

With reference to FIG. 4C, the derivative lines 115D-TM and 115D-TE represent locations where the gray level intensity changes. As such, for each mode line 115, the transition from a high gray level intensity to a low gray level intensity happens toward the front of the mode line, and a transition from low to high gray intensity also happens towards the rear of the mode line. The derivative intensity transitions thus appear as lines/bands in the derivative space because as discussed above the derivative spectrum 113D shows the rates of changes in gray level intensity with position, with highest/lowest rate of change in gray level intensity within the local regions appearing as the brightest or darkest pixel in that region.

An example derivative method processes the derivative spectrum 113D using three main steps: 1) isolate subsections of the derivative spectrum 113D where derivative intensity transitions take place, to identify derivative lines 115D-TM and 115D-TE and critical angle transition lines 116D-TM and 116D-TE; 2) find the derivative intensity transition locations (positions) by either the weighted linear regression method or a two-layered weighted regression shape detection method such as described in greater detail below; and 3) check to confirm that the detected derivative intensity transition is associated with a mode line 115 or a critical angle transition 116 in the mode spectrum 113 and not an artifact from the original mode spectrum image.

The first main step can be performed by analyzing the column-wise averages of the derivatives of the gray level intensities for the TM and TE derivative spectra 113D-TM and 113D-TE. Here, column-wise means in the direction along the lengths of the mode lines 115. In the column-wise averaged plots described herein, the "peak points" or "peaks" in the curves are denoted PP and the "valley points" or "valleys" are denoted VP, with TM and TE subscripts for the TM and TE plots, respectively. The TM and TE critical angle transition points of the TM and TE critical angle transitions 116TM and 116TE are respectively denoted $CP_{TM}$ and $CP_{TE}$.

Figure 5A:
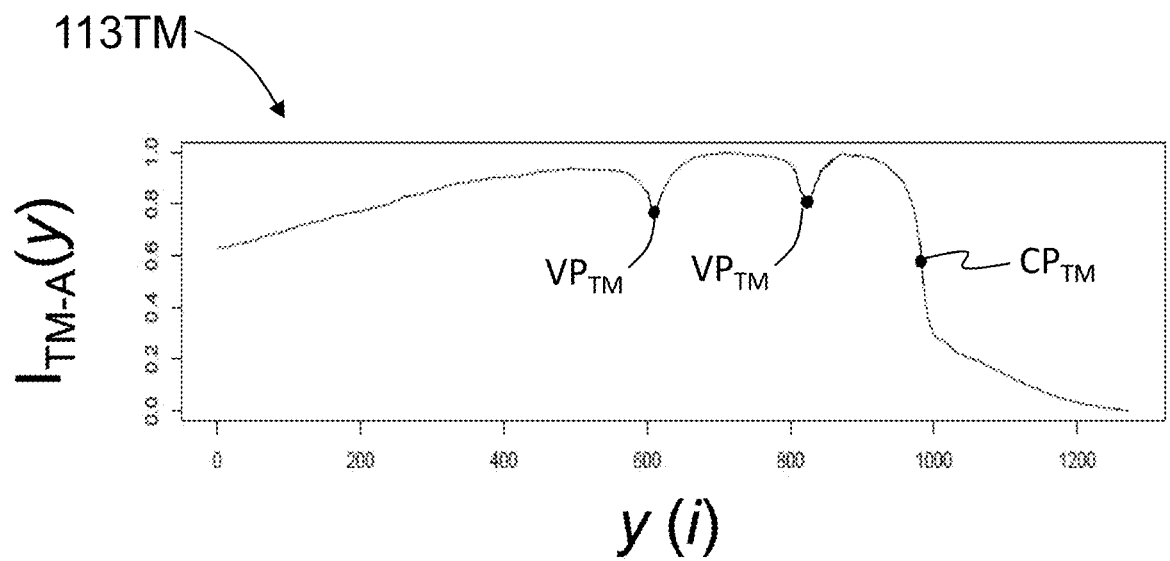
FIGS. 5A and 5B are plots of the column-averaged normalized 1D intensity profiles $I_{TM-A}(y)$ and $I_{TE-A}(y)$ as a function of the y position (pixel number i) for the example TM mode spectrum (FIG. 5A) and the example TE mode spectrum (FIG. 5B), for the mode spectrum of FIG. 4B.
Figure 5B:
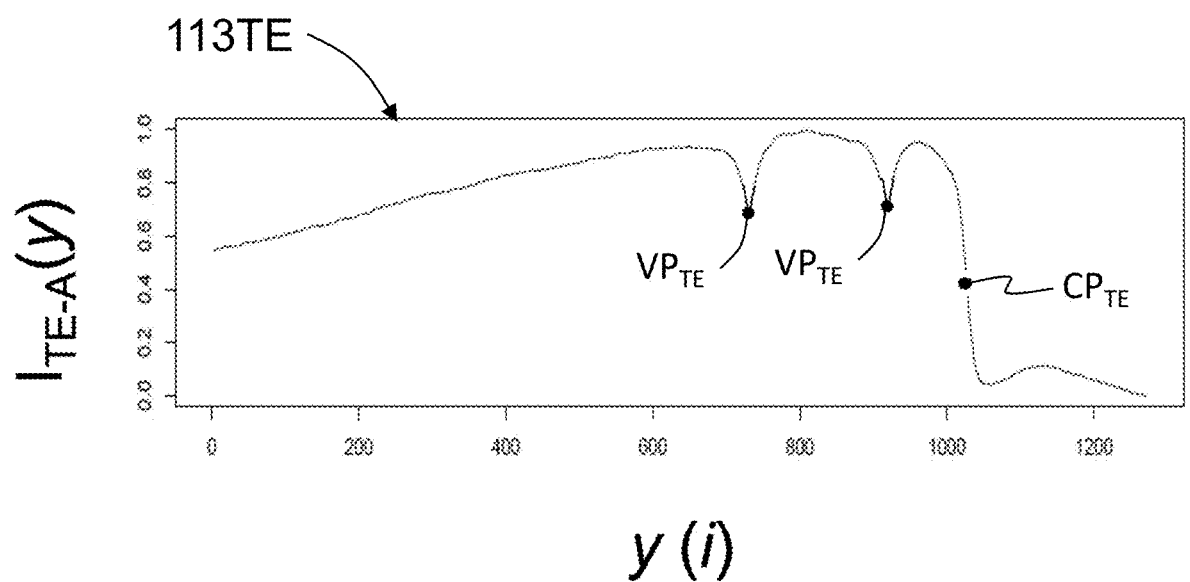

FIGS. 5A and 5B are plots of the column-averaged normalized 1D intensity profiles $I_{TM-A}(y)$ and $I_{TE-A}(y)$ as a function of the y position (pixel number i) for the example TM mode spectrum 113TM (FIG. 5A) and the example TE mode spectrum 113TE (FIG. 5B), for the mode spectrum of FIG. 4B. The intensity minima for the TM and TE mode lines 115TM and 115TE are shown as dark circles while the critical angle transitions 116TM and 116TE are also indicated by a dark circle.

Figure 6A:
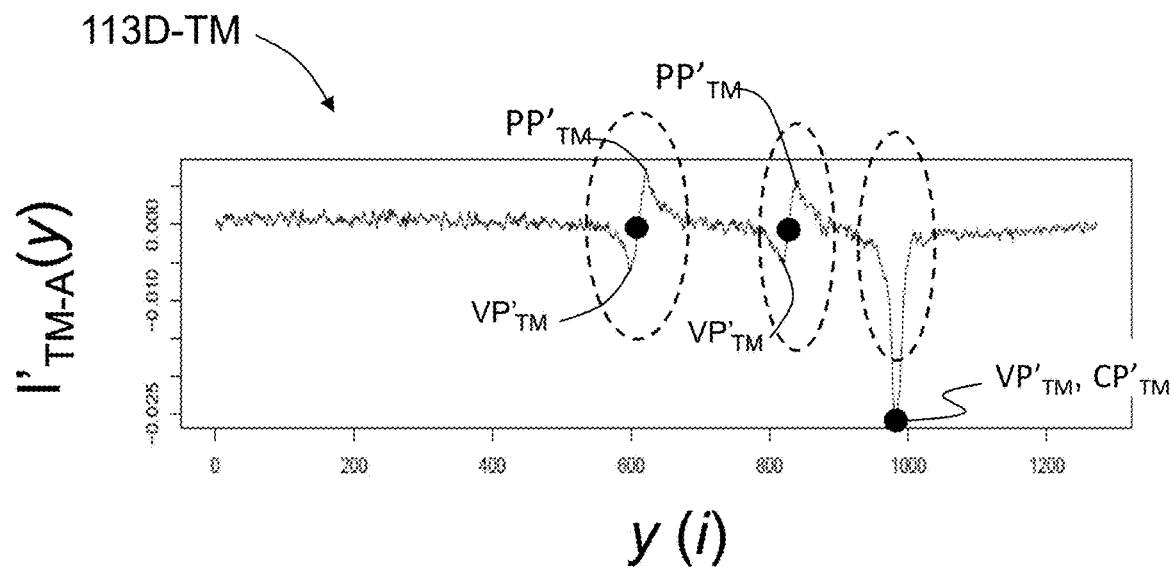
FIGS. 6A and 6B are plots of the column-averaged normalized 1D intensity rate of change I' (relative units) versus the y-position (relative units) for the derivative spectrum of FIG. 4C for the TM mode spectrum and the TE mode spectrum, respectively.
Figure 6B:
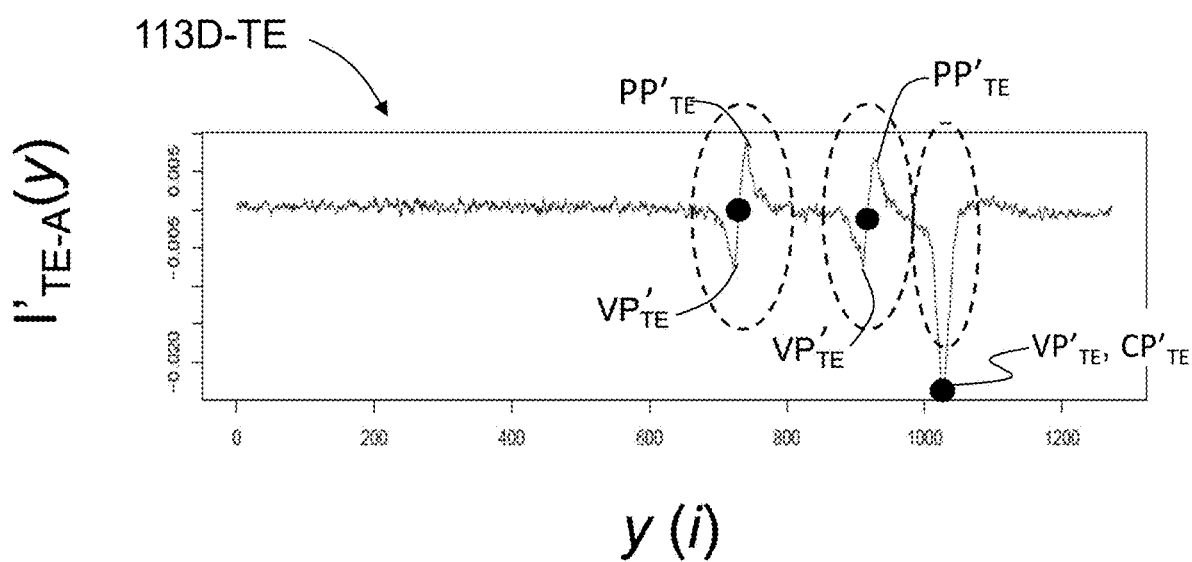

FIGS. 6A and 6B are the column-wise intensity averages $I'_{TM-A(y)}$ and $I'_{TE-A(y)}$ as a function of they position (pixel number i) for the TM and TE derivative spectra 113D-TE and 113D-TM of the derivative spectrum 113D of FIG. 4C. With reference to FIGS. 6A and 6B, the deep valley points VP' and the peak points PP' (within the dashed-line circles) correspond to derivative lines 115D-TM and 115D-TE in the derivative space and serve to identify locations (points) of the intensity transitions TP (dark circles) in the corresponding mode lines 115TM and 115TE for the mode spectra 113TM and 113TE shown in FIGS. 5A and 5B. The critical transition lines are respectively denoted $CP'_{TM}$ and $CP'_{TE}$ and correspond to the critical angle transitions 116TM and 116TE in the mode spectra 113TM and 113TE of FIGS. 5A and 5B.

The curves in the mode spectra 113 and derivative spectrum 113D are based on averaged gray level intensities and the averaged derivatives of the gray level intensities are typically not smooth. Consequently, an example aspect of the method involves smoothing the mode spectrum curves and the derivative spectrum curves using a smoothing operation, such as a moving average or a smoothing function prior to using the curves to preselect/isolate the possible locations of mode line transitions. Even though the transitions are usually at the valley/peak of the average derivative of the gray level intensity, image defects can also generate valleys/peaks in the curves and introduce errors in the calculations used to determine the characteristics of the IOX article 10 being considered.

Assuming the average derivative of the gray level intensity is s, the possible locations of the derivative intensity transitions can be found using the following steps.

The first step involves finding the points at the bottom of a valley VP' and at the top of a peak PP' for the derivative intensity transitions in the given derivative spectrum 113D-TM or 113D-TE (see FIGS. 6A, 6B), wherein the points meet the following conditions:

$$S_i \leq -s_{min}; \; s_i \geq s_{max}; \quad (3A)$$

where $s_{min}$ and $s_{max}$ are two parameters that can be chosen by selecting a first percentage (e.g., ~30%) of the negative average derivative data for the valleys and a second percentage (e.g., ~15%) of the positive average derivative data for the peaks being selected. The example first and second percentages set forth above are example values based on experiments and can be adjusted as needed for optimal results.

The second step is directed to dividing the data points found using eqn. (1A) into groups. This is accomplished in one example by linking all the consecutive data into separate groups, then finding the minimums from each negative valued group, and finding the maximums from each positive valued group, and then keeping only the minimum and maximum data points that are the likely peak/valley locations.

The third step is to keep only the valley points VP' in the above collection of data points that are followed by a peak point PP' if the valley is not the last data point in the data collection from the above step.

The last (rightmost) valley points VP' are associated with the derivative critical transition lines so are denoted as both VP' and CP'. The other valley points VP' (which are followed by peak points PP') for a given derivative line represent transitions taking place in front of the given mode line, while the peak points PP' represent the transitions taking place at the back of the given mode line.

Figure 7A:
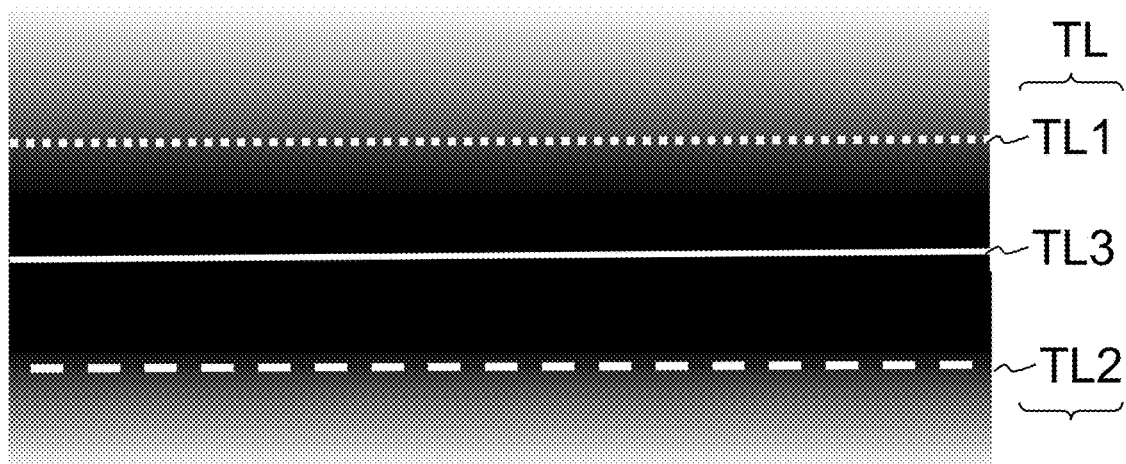
FIG. 7A is a close-up view of an example mode line (TM or TE) that identifies intensity transitions in an example mode line using transition lines TL based on the peaks and valleys identified in the corresponding derivative line of the derivative spectrum.

FIG. 7A is a close-up view of an example mode line 115 (TM or TE) that identifies intensity transitions using transition lines TL. The locations of the transition lines TL are based on the valley points VP' and the peak points PP' for the corresponding derivative line 115D for the corresponding derivative spectrum 113D. The regions between adjacent transition lines TL constitute transition regions or transition sections.

The dotted white line is a first transition line TL1 where the image gray level intensity changes the fastest from high to low. The dashed white line is a second transition line TL2 where the transition of the image gray level intensity changes fastest from low to high. The solid white indicates where the gray level intensity reaches the lowest points, which can be established as a fitted line FL using the methods discussed below, including the weighted regression methods and the two-layered weighted regression methods discussed below.

Figure 7B:
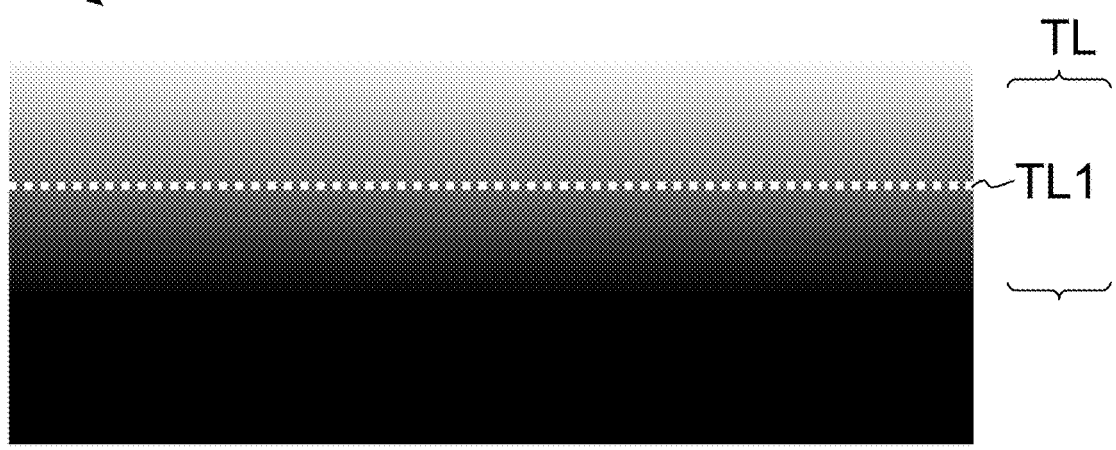
FIG. 7B is a close-up view of an example critical angle transition (TM or TE) that identifies a transition line TL1 indicating a maximum intensity range of change from light to dark as identified by the valley point or critical angle transition point obtained from the derivative critical transition line of the derivative spectrum.

FIG. 7B is similar to FIG. 7A and shows a close-up of an example critical angle transition 116 where the transition line TL1 is based on the valley point VP'=CP' from the derivative critical transition line of the derivate spectrum 113D (see e.g., FIGS. 6A and 6B). Unlike a mode line 115, at the critical angle transition 116 the gray level intensity of the original image changes to the lowest level without changing back to its starting level of gray level intensity, so that there is only a single transition line TL=TL1 associated with the derivative critical angle transition line. This transition line is used to establish an estimated position of the critical angle transition 116 in the mode spectrum 113.

The transition lines TL are then applied to the mode spectrum 113 and in particular on the mode lines 115 and the critical angle transitions 116 to establish estimates of the positions of the mode lines 115 and critical angle transitions. The estimated positions of the mode lines 115 and critical angle transitions 116 are then used to calculate one or more optical properties (e.g., at least one stress-related characteristic) of the IOX article 10.

In summary, the derivative-based method includes the following main steps: 1) calculating a derivative spectrum from the mode spectrum to form from the intensity transitions defined by the mode lines 115 and the critical angle transitions 116 derivative intensity transitions that include derivative lines (associated with the mode lines) and derivative critical transition lines (associated with the critical angle transitions; 2) determining a fitted line for each derivative intensity transition to define a set of fitted lines having respective positions in the mode spectrum; 3) performing error checking on each fitted line in the set of fitted lines to assess whether the given derivative intensity transition corresponds to an intensity transition in the mode spectrum or to noise in the mode spectrum, and discarding any of the fitted lines found to be due to noise, thereby defining a set of checked fitted lines; 4) defining the estimated positions of the intensity transitions in mode spectrum as the respective positions defined by the set of checked fitted mode lines in the derivative spectrum, thereby forming a "corrected" or "improved" mode spectrum. 5) using the corrected or improved mode spectrum to estimate at least one stress-related characteristic of the IOX article 10.

Mode Line Position and Tilt Angle Estimation Methods

Figure 8A:
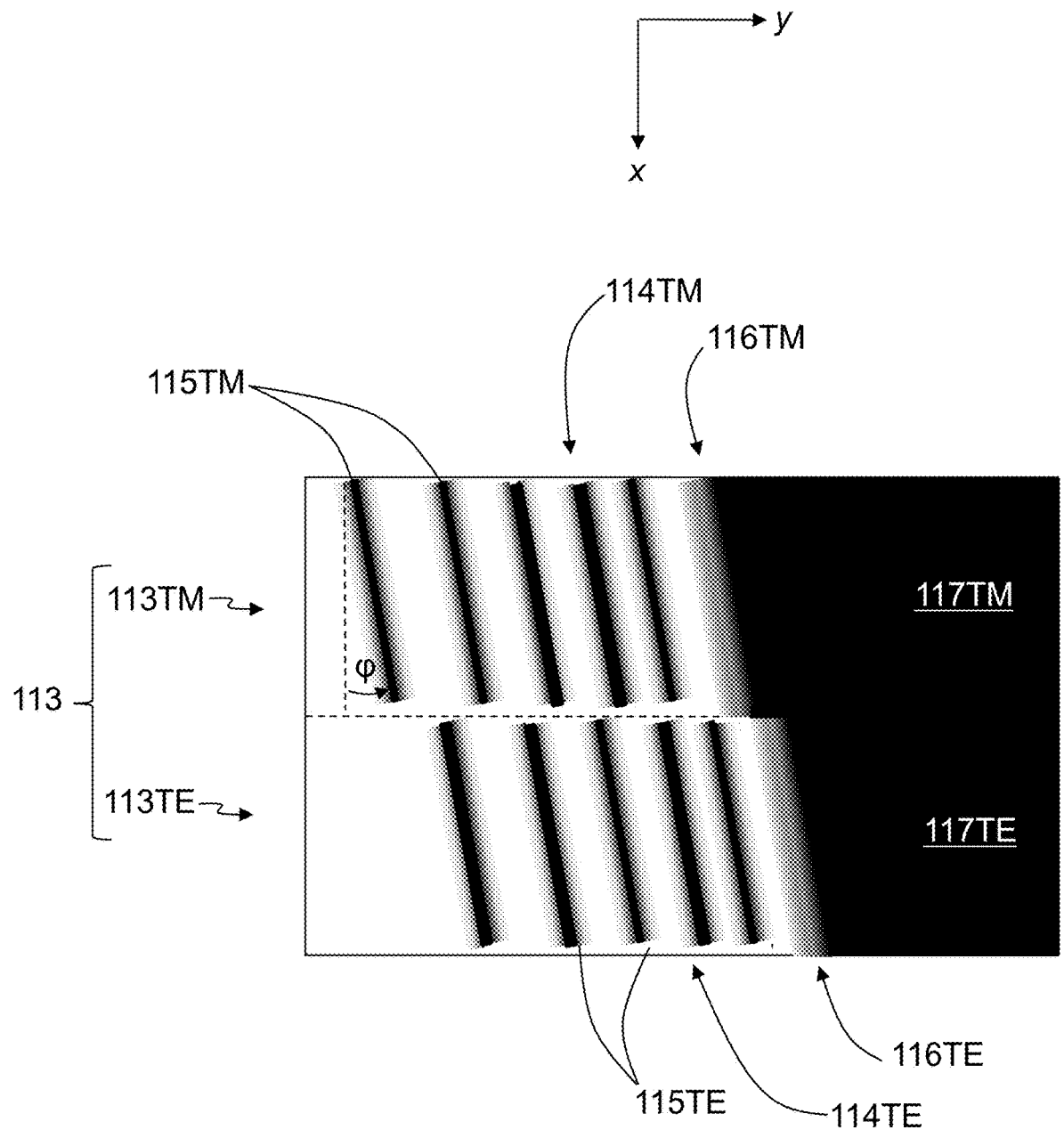
FIG. 8A is a schematic representation of an example mode spectrum that shows both mode line tilt and reduced mode line contrast, each of which complicates establishing accurate mode line positions needed for an accurate calculation of stress-related parameters of the IOX article being measured.
Figure 8B:
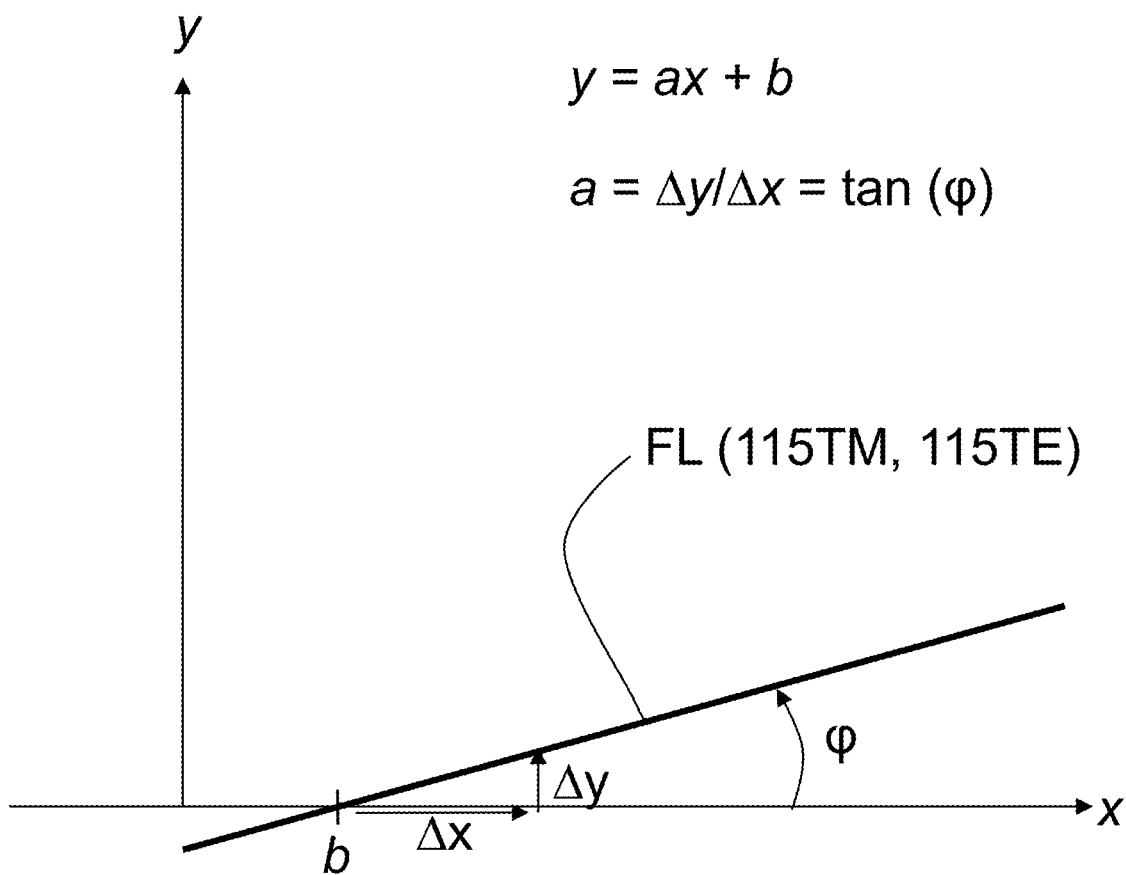
FIG. 8B is a close-up schematic diagram of the local x-y coordinate system for calculating the slope (a) and tilt angle ($\varphi$) for a given mode line of a mode spectrum when using the weighted least squares method described herein.

FIG. 8A is similar to FIG. 4A and illustrates an example mode spectrum 113 wherein the mode lines (mode lines) 115TM and 115TE are tilted at tilt angle $\varphi$ relative to the x-axis of the local x-y coordinate system for the mode spectrum 113. FIG. 8B is a schematic diagram of the local x-y coordinate system illustrating how the tilt angle $\varphi$ is measured, along with the slope $\alpha$ and intercept b of the example mode line 115TM or 115TE. In FIG. 8B, the local x-y coordinate system has been rotated so that the y-axis is vertical.

The tilt angle $\varphi$ shown is positive since it involves a counterclockwise rotation from the x-axis. The slope $\alpha$ is also positive since both $\Delta y$ and $\Delta x$ are positive. In an example, the different TM mode lines 115TM and the different TE mode lines TE can all have slightly different tilt angles $\varphi$ or slopes $\alpha$. In the discussion and in the calculations below, the slope $\alpha$ is used to describe the tilt or rotation of a given mode line. It will be apparent to one skilled in the art that the tilt angle can also be used without loss of generality, since $\alpha = \tan(\varphi)$ and for small angles, $\alpha \approx \varphi$. Thus, the term "tilt" as used herein can refer to either the tilt angle or the slope since each is a measure of the amount of tilt.

Thus, in an example, the average slope $\bar{\alpha}$ is defined as the average of all of the slopes $\alpha$ of all of the TM and TE mode lines 115TM and 115TE of the given mode spectrum 113. In some of the discussion below, it is sometimes assumed for ease of explanation that the different slopes $\alpha$ of the TM and TE mode lines 115TM and 115TE do not vary substantially, so that for a given mode spectrum $\bar{\alpha} \approx \alpha$.

A tilt in the TM and TE mode lines 115TM and 115TE greatly complicates the measurement of the mode line locations (i.e., y positions) used to calculate stress-related characteristics of the IOX article 10. In addition, a reduction in contrast of the TM and TE mode lines 115TM and 115TE can make determining the exact center of each of the mode lines substantially more difficult, especially since the reduction in contrast may not be (and typically is not) symmetrical with respect to an ideal mode line. Such ambiguities in the mode spectrum 113 obviate simple approaches for determining mode line position and mode line tilt. For example, a simple approach for determining mode line tilt would be to measure top and bottom relative positions of a given mode line and then employ simple geometric principles of triangles to obtain the tilt. The problem with this approach is that it assumes the precise position of the mode line is known when in fact it may not be easily determined from the raw data, i.e., the digital image of the mode spectrum (also called the mode spectrum image). Consequently, simple approaches such as described above result in inaccurate calculations of stress-related characteristics of the IOX article 10 being measured.

Current mode line detection methods use computer fitting of the mode lines based on iterative calculations and the gray scale intensity profile of a given mode line 115TM or 115TE. The iterative fitting is performed using a Gaussian function or some other functional form for the shape of the mode line intensity profile and using the fitting parameters to define a mode line location. Although such fitting methods can work reasonably well, they require iterations to reach a convergence and are thus slow even when carried out by computer. Moreover, they do not always have the best accuracy. The slowness is a problem from a commercial viewpoint because it reduces measurement throughput of the IOX articles. In a manufacturing environment, reduced measurement throughput translates directly into increased manufacturing costs. In addition, inaccuracy in determining the mode line positions is a problem because it translates directly into errors in the calculated stress-related characteristic, which in turn translates into reduced quality control and increased manufacturing costs.

An aspect of the disclosure is directed to methods of finding the positions of the mode lines and the tilts of the mode lines. The methods are referred to as being an estimate since the digital nature of the captured mode spectrum makes it hard if not impossible to know an exact mode line position.

The mode line estimation method disclosed herein can be divided into three main steps: 1) approximately locating the TM and TE mode lines 115TM and 115TE using one-dimensional (1D) averaged gray scale intensity curves from the two-dimensional digital mode spectrum image; 2) establish/estimate mode line positions using a machine learning method, more specifically a modified type of weighted least square method on the two-dimensional mode spectrum 113TM and/or 113TE; and 3) remove any "false" mode lines that are not true mode lines, with the removal being based on criteria relating to estimated positions, slopes and widths of typical mode lines.

The second step 2) can be broken down into the following two sub-steps: i) set up a total loss function that uses a weight that is based on gray level intensity. For the dark mode lines, errors at darker pixels are weighted more than at lighter pixels to force the fitted line to pass through the darker pixels. For light or bright mode lines, errors at the lighter pixels are weighted more than the darker pixels to force the fitted line to pass through the lighter pixels; ii) minimize the loss function analytically using a modified weighted least squares method that provides an analytical solution for the best estimate of the mode line position and tilt angle φ.

Figure 8C:
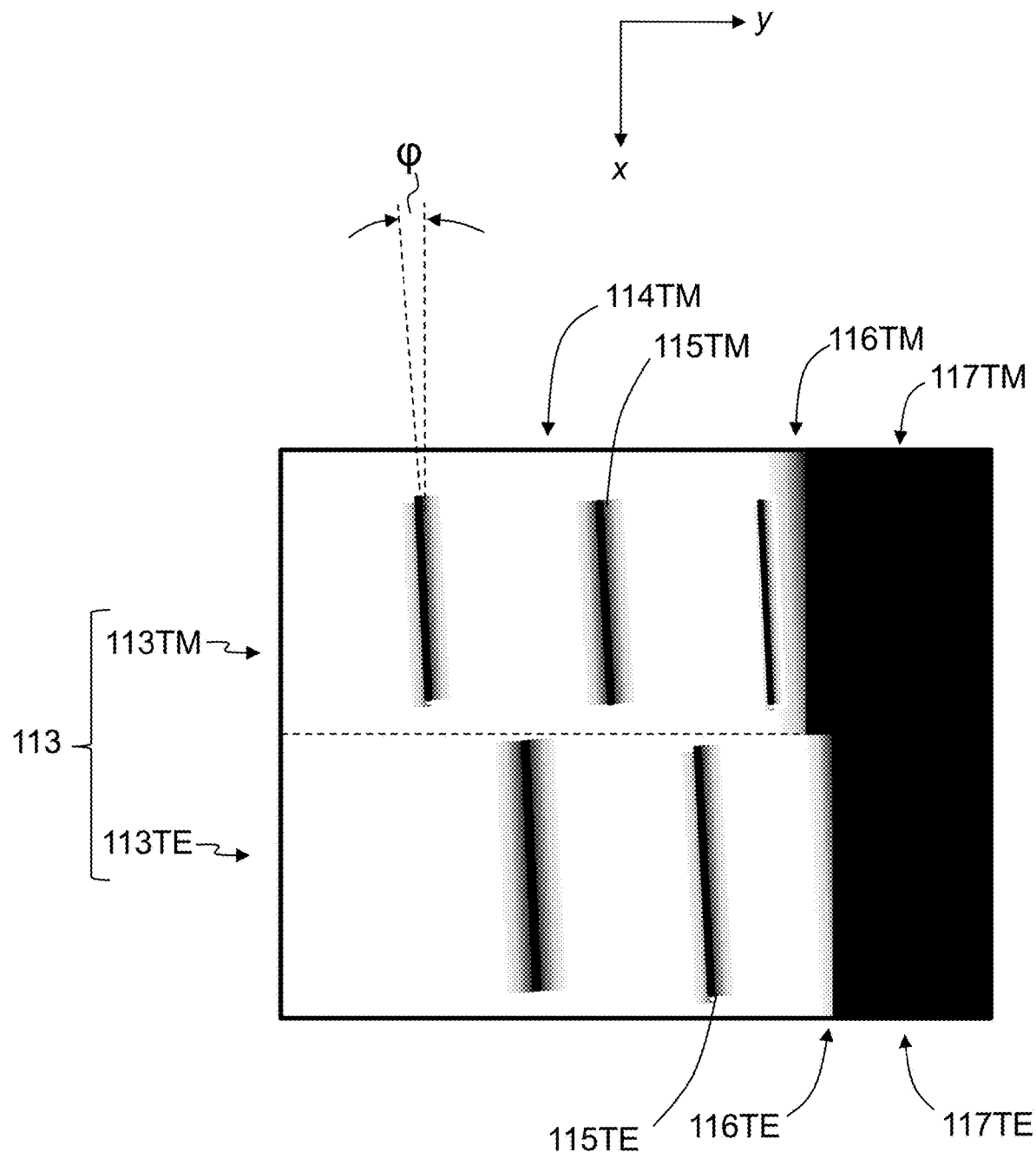
FIG. 8C is a schematic representation of a mode spectrum of an IOX article measured using the prism-coupling system, wherein the TM mode spectrum has three tilted TM mode lines and the TE mode spectrum has two tilted TE mode lines.

FIG. 8C is a schematic representation of an actual mode spectrum 113 of an IOX article as measured using the prism-coupling system 28, wherein the TM mode spectrum 113TM has three mode lines 115TM and the TE mode spectrum 113TE has two mode lines 115TE. The TM and TE mode lines 115TE and 115TM are nearly vertical, i.e., they have a slight (positive) tilt angle φ and thus a small but positive slope α. The tilt of the mode lines 115TM and 115TE in FIG. 4D is exaggerated as compared to the actual data for ease of illustration.

As discussed above, the measured TM mode spectrum 113TM has a discrete 2D intensity distribution $I_{TM}(x,y)$ while the TE mode spectrum 113TE has a discrete 2D intensity distribution $I_{TE}(x,y)$, with the discreteness being due to the digital capture of the mode spectrum 113 using a detector 110 comprising a two-dimensional array of pixels 112P.

To establish initial positions of the mode lines 115TM and 115TE, in one example the intensities $I_{TM}(x,y)$ and $I_{TE}(x,y)$ are averaged in the x direction to define respective y-averaged ("column averaged") 1D discrete intensity profiles $I_{TM-A}(y)$ and $I_{TE-A}(y)$, as discussed above in connection with FIGS. 5A and 5B.

Figure 9A:
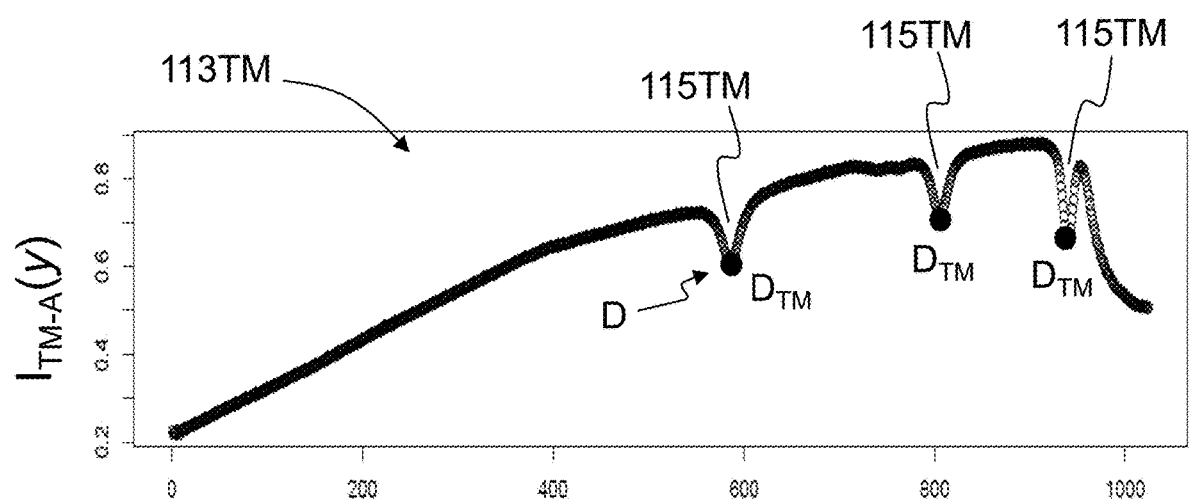
FIGS. 9A and 9B are plots of the normalized 1D intensity profiles $I_{TM-A}(y)$ and $I_{TE-A}(y)$ as a function of the y position (pixel number i) for the example TM mode spectrum and the example TE mode spectrum, respectively, of FIG. 8C, wherein the 1D intensity profiles are obtained by averaging the intensity values in the x-direction ("column averaging").
Figure 9B:
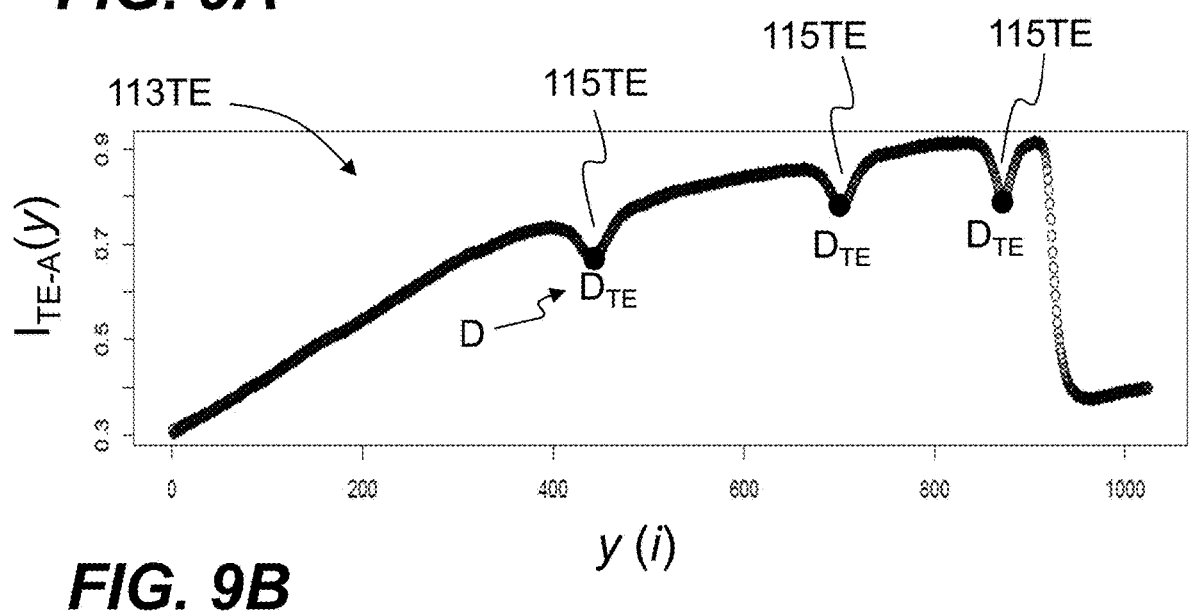

FIGS. 9A and 9B are plots of the normalized (averaged) 1D intensity profiles $I'_{TM-A(y)}$ and $I'_{TE-A(y)}$ as a function of the y position (in pixel number i) for the TM mode spectrum 113TM and the TE mode spectrum 113TE, respectively, for the mode spectrum 113 of FIG. 8C. The intensity profiles $I'_{TM-A(y)}$ and $I'_{TE-A(y)}$ have dips D (respectively denoted as $D_{TM}$ and $D_{TE}$), which are assumed to be the approximate locations of the TM and TE mode lines 115TM and 115TE, respectively.

To find the y locations of the dips $D_{TM}$ or $D_{TE}$ in the averaged intensity profiles $I_{TM-A}(y)$ and $I_{TE-A}(y)$ with sufficient accuracy to perform sufficiently accurate calculations for stress-related characteristics of the IOX article 10 being measured, an approach is required that provides sufficient certainty about whether the true bottom of the dip $D_{TM}$ or $D_{TE}$ (i.e., the best estimate) has been found. The discussion above presented one example method based on taking the derivative spectrum of the mode spectrum and using the derivative lines to identify transition subsections in the mode spectrum to be processed.

Another example process used to accurately determine the location of bottom of a given dip D has select constraints based on intensity averaging. In the calculations below, the discrete x-averaged intensities defined by $I_{TM-A}(y)$ or $I_{TE-A}(y)$ is represented by $z_i$ for ease of notation, where the subscript i denotes the pixel.

One constraint is that the bottom of a given dip D has the lowest average gray scale intensity $z_i$ among a given pixel range on either side (e.g., widths of $m_l$ and $m_r$ pixels to the "left" and "right," respectively) of the pixel i as given by:

$$z_i \le \min(z_{i+k}, k=1,2 \ldots m_r); z_i \le \min(z_{i-k}, k=1,2 \ldots m_l) \quad (1B)$$

Another constraint is that the average of the gray scale intensity $z_i$ at the bottom of the dip D is smaller than the averages of the averaged gray scale intensity of a given number of the neighboring pixels. Given the widths to be averaged as $m_r$ and $m_l$ (measured numbers of pixels) and the respective intensity margins as $z_{mr}$ and $z_{ml}$, $z_i$ is given by:

$$z_i \le \frac{\sum_{k=1}^{m_r} z_{i+k}}{m_r} - z_{mr}; z_i \le \frac{\sum_{k=1}^{m_l} z_{i+k}}{m_l} - z_{ml} \quad (2B)$$

Another constraint is that the gray scale intensity at the bottom of the dip D is at least a given value lower than the peak average gray scale intensity from the left up to the valley. Giving the backward looking width as $m_{lo}$, and the margins as $z_{pl}$, we have $$z_i \le \max(z_{i-k}, k=1,2 \ldots m_{lo}) - z_{pl} \quad (3B)$$

After all the dips D in the given 1D discrete intensity profiles for the column-averaged TM and TE mode spectra 113TM and 113TE are located and all the (possible) mode lines therein are approximately determined, more exact mode line positions are determined (including a slope and intercept) by fitting a line to the lowest (smallest) intensities (for dark mode lines) for a sub-section of the original two-dimensional image around each approximate mode line.

Figure 10A:
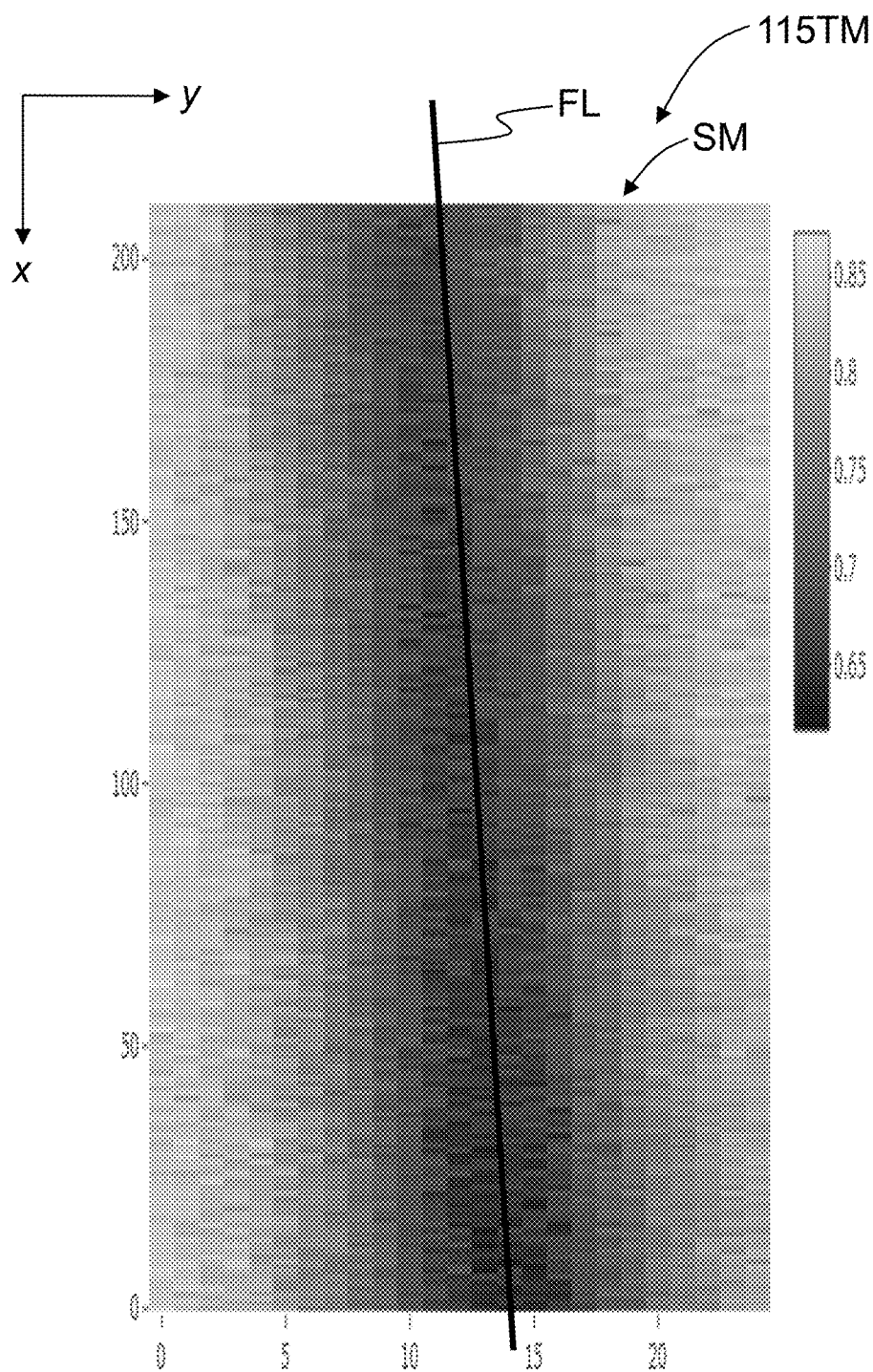
FIG. 10A is a close-up view of an example section of an example 2D gray scale intensity profile in the vicinity of a TM mode line of a TM mode spectrum of FIG. 4C, and showing a fitted line FL to the intensity extrema (e.g., lowest intensities).

FIG. 10A is a close-up view of an example section SM of an example 2D gray scale intensity profile (mode spectrum image 113TM) taken around an example TM mode line 115TM, and showing the fitted line FL to the lowest intensities.

Single-Layer Weighted Regression Detection Method

As noted above, it is assumed that the mode line being analyzed has a slope and an intercept given by the standard line formula (in the local x-y coordinates):

$$y = ax + b \quad (4B)$$

where α is the slope (i.e., the rotation that give rise to the tile) and b is the intercept (see FIG. 8B). The mode line is a best fit to the darkest pixels (assuming the mode lines are dark lines) so that darker pixels are given more weight than lighter pixels. Thus, in an example, a weighted least-square method is used to establish the best fit line FL.

Assuming n is the total number of points to be fitted, an objective function (or "loss function" as it is referred to in the art of machine learning) F is defined as:

$$F = \sum_{i=0}^{n} w_i(y_i - ax_i - b)^2 \quad (5B)$$

The objective function is minimized to find the best fit line by taking derivatives of the objective function with respect to the slope a and intercept b and letting them vanish, i.e.:

$$\frac{\partial F}{\partial a} = -2\sum_{i=0}^{n} w_i x_i (y_i - ax_i - b) = 0;$$

$$\frac{\partial F}{\partial b} = -2\sum_{i=0}^{n} w_i (y_i - ax_i - b) = 0.$$

The solutions to these equations are respectively given by:

$$a = \frac{\sum_{i=1}^{n} w_i y_i x_i - \overline{y^*}\sum_{i=1}^{n} w_i x_i}{\sum_{i=1}^{n} w_i x_i^2 - \overline{x^*}\sum_{i=1}^{n} w_i x_i} \quad (6B)$$

$$b = \frac{\overline{y^*}\sum_{i=1}^{n} w_i x_i^2 - \overline{x^*}\sum_{i=1}^{n} w_i y_i x_i}{\sum_{i=1}^{n} w_i x_i^2 - \overline{x^*}\sum_{i=1}^{n} w_i x_i} \quad (7B)$$

$$\text{where } \overline{x^*} = \frac{\sum_{i=1}^{n} w_i x_i}{\sum_{i=1}^{n} w_i} \text{ and } \overline{y^*} = \frac{\sum_{i=1}^{n} w_i y_i}{\sum_{i=1}^{n} w_i} \quad (8B)$$

A weighting function $w_i$ can be used to emphasize the importance of the darker pixels over the lighter pixels, i.e. the weight function $w_i$ weights the same distance between the fitted line to the pixel coordinates at a darker pixel weight more in the total loss than at a lighter pixel to force the line to pass through the darker pixels.

Thus, the weighting function $w_i$ causes the fitted line to more closely hew to the intensity extremum, which is an intensity minimum in the present example. The intensity extremum can also be an intensity maximum for examples where the mode lines are bright.

An example weighting function F is an exponential function of the difference between the gray scale pixel intensity $p_i$ and the minimum gray scale intensity, i.e., the darkest pixel. An example exponential weighting function $w_i$ is given by:

$$w_i = e^{-\alpha(p_i - \min[P_k, k=1,2 \ldots n])}; i=1,2 \ldots n \quad (9B)$$

where α is a positive constant.

From Eqn. (9B), the darkest pixel ($p_i$=min ($p_k$, k=1, 2 ... n)) has a weight equal to 1 and the lighter pixels have a less weight. The exponential constant α determines how much more weight a darker pixel has versus a lighter pixel. To make the weight reduce quickly from dark to light pixels, the value of the exponential constant α is increased. Other weighting functions $w_i$ that provide a relatively rapid change in weighting from dark to light pixels can also be used. Note that for a mode spectrum having bright lines, the weighting would be the opposite. Thus, the weighting in general is based on the local extremum in intensity associated with the given type of mode line (i.e., bright or dark).

Two-Layer Weighted Regression Detection Method

Another example method for mode line fitting and detection includes a two-layer weighted regression detection method. The method is similar to the single-layer method except that it incorporates derivative information about the gray scale pixel intensity such as discussed above in the derivative-based method. Thus, the "two layer" appellation reflects the use of both the intensity extremum and the transition intensity for each mode line 115 in the weighting process that defines a fitted line for each mode line, as described below.

For each row (or column for horizontal, or mostly horizontal, lines) of the intensity profile section SM of FIG. 10A, the method finds the most likely column (or row for horizontal lines) position where the transition will be by finding the intensity dependent weighted average of the pixel y locations on the row. Assuming the derivative of the gray level intensity at pixel ($x_i$, $y_j$) is $d_{ij}$, and assuming also there are a total number of $m_i$ points at row i, the most likely column/row location $\hat{y}_i$ and the resultant pixel intensity of the row/column are:

$$\hat{y}_i = \frac{\sum_{j=1}^{m_i} w_{ij}^r y_j}{\sum_{j=1}^{m_i} w_{ij}^r} \quad (1C)$$

$$\hat{d}_i = \frac{\sum_{j=1}^{m_i} w_{ij}^r d_{ij}}{\sum_{j=1}^{m_i} w_{ij}^r} \quad (2C)$$

where the weight coefficient w is intensity derivative dependent. To find a dark shape in the derivative space, the weight coefficient gives a dark pixel more weight than a light pixel and to find a bright shape, the weight coefficient gives a bright pixel more weight.

One example weight function is an exponential function of the difference between the gray level intensity $p_{ij}$ at the pixels and the minimum/maximum gray level intensity $d_{min}$=min [$d_{ij}$, j=1,2 ... $m_i$] or $d_{max}$=max [$d_{ij}$, j=1,2 ... $m_i$] (the darkest or the brightest point at row i, depending on the type of lines to be found) of either the row or the entire image.

$$w_{ij}^r = e^{-\beta(d_{ij} - d_{min})} \text{ Dark Shape (transition from bright to dark)}$$

$$\text{or } w_{ij}^r = e^{-\beta(d_{max} - d_{ij})} \text{ Bright Shape (transition from dark to bright); } (3C)$$

where β is a given positive constant. From Eqn. (3C), it can be seen that in finding the dark shape in the derivative space (transition from bright to dark in the original image space), the darkest pixel point ($d_{ij}$=$d_{min}$) will have a weight equal to 1 and the lighter pixels will have a less weight in deciding the shape. On the other hand, in finding a bright shape in the derivative space (transition from dark to bright), the brightest pixel point ($d_{ij}$=$d_{max}$) will have a weight equal to 1 and the darker pixels will have a less weight in deciding the transition shape (such as a line).

The exponential constant determines how different in weight a darker point would be from a lighter point in the derivative space. To make the weight reduce quickly by the derivative of the gray level intensity, the value of the exponential constant β can be increased. Another possible weight function is the Dirac delta function where the weight has value 1 at the darkest/brightest pixel of the row and has value zero at all other pixels. The purpose of the weight is to distinguish the effect of the derivative of the gray level intensity in determining the most likely position the transition shape will pass at each row/column.

From the most likely points ($x_i$, $\hat{y}_i$) of all the rows (or columns for horizontal lines), find the best fitted shape using a weighted regression method. As an example, for FSM images, the goal is to find a fitted line that connects the most likely points ($x_i$, $\hat{y}_i$) that define a given TM or TE mode line 115TM or 115TE or critical angle transition 116TM or 116TE. The equation for the fitted line is:

$$y = ax + b \quad (4C)$$

where α is the slope (rotation) and b is the intercept of the fitted line. Assume that n is the total number of most likely points (total number of rows, or columns for horizontal lines, which have a resultant point $\hat{y}_i$) to be fitted. To find the best fitted line, a loss function F, as it is normally called in machine learning, is defined as:

$$F = \Sigma_{i+0}^{n} w_i^e (\hat{y}_i - ax_i - b)^2 \quad (5C)$$

The loss function F is then minimized. To minimize the loss function F (best fit to the darkest points), the derivatives of the loss function are taken with respect to a and b with the loss function set equal to zero:

$$\frac{\partial F}{\partial a} = -2 \sum_{i=0}^{n} w_i^e x_i (\hat{y}_i - ax_i - b) = 0; \quad (6C)$$

$$\frac{\partial F}{\partial b} = -2 \sum_{i=0}^{n} w_i^e (\hat{y}_i - ax_i - b) = 0$$

and the solution is:

$$a = \frac{\sum_{i=1}^{n} w_i^e \hat{y}_i x_i - \overline{y}^* \sum_{i=1}^{n} w_i^e x_i}{\sum_{i=1}^{n} w_i^e x_i^2 - \overline{x}^* \sum_{i=1}^{n} w_i^e x_i} \quad (7C)$$

$$b = \frac{\overline{y}^* \sum_{i=1}^{n} w_i^e x_i^2 - \overline{x}^* \sum_{i=1}^{n} w_i^e \hat{y}_i x_i}{\sum_{i=1}^{n} w_i^e x_i^2 - \overline{x}^* \sum_{i=1}^{n} w_i^e x_i}$$

$$\text{where } \overline{x}^* = \frac{\sum_{i=1}^{n} w_i^e x_i}{\sum_{i=1}^{n} w_i^e}, \quad \overline{y}^* = \frac{\sum_{i=1}^{n} w_i^e \hat{y}_i}{\sum_{i=1}^{n} w_i^e} \quad (8C)$$

To find a dark line in the derivative space (transition from bright to dark in the original image space), the weight function w should make a dark resultant pixel $\hat{d}_i$ at the most likely position $\hat{y}_i$ have more weight than a light pixel. One weight function is the same exponential function form as given in eq. (3C). The constant may have a different value (and is thus denoted as a below), with the value depending on the difference between the derivative of the gray level resultant intensity $\hat{d}_i$ at the pixels and the minimum gray level intensity (the darkest point) among all the rows:

$$w_i^e = e^{-\alpha(\hat{d}_i - \min[\hat{d}_k, k=1,2\ldots n])}; \, i=1,2\ldots n \quad (9C)$$

where α is a given non-negative constant. From Eqn. (9C), it can be seen that the darkest resultant pixel point ($\hat{d}_i$ =min ($\hat{d}_k$, k=1, 2 . . . n)) will have a weight equal to 1 and the lighter pixels will have less weight in determining the fitted line. The exponential constant α determines how much more weight a darker point would have than a lighter point. To make the weight reduce quickly from dark to light pixels, the value of the exponential constant α can be increased. When α=0, the weight is one for all resultant pixels, i.e. the line will be equally likely to be close to a dark resultant pixel and to a light resultant pixel resultant point $\hat{y}_i$. Likewise, a similar weight function can be employed to find a bright line in the derivative space (transition from dark to bright in the original image space).

Once the best fit line (fitted line) FL is found, an error checking process as described below can be carried out to ensure that noise does not adversely affect the determination of the fitted line FL.

Error Checking

As mentioned above, once a fitted line FL to a mode line 115 is determined according to the two-layer method described above, it can be checked to see whether the determined fitted line was prone to noise that can cause an error.

Figure 10B:
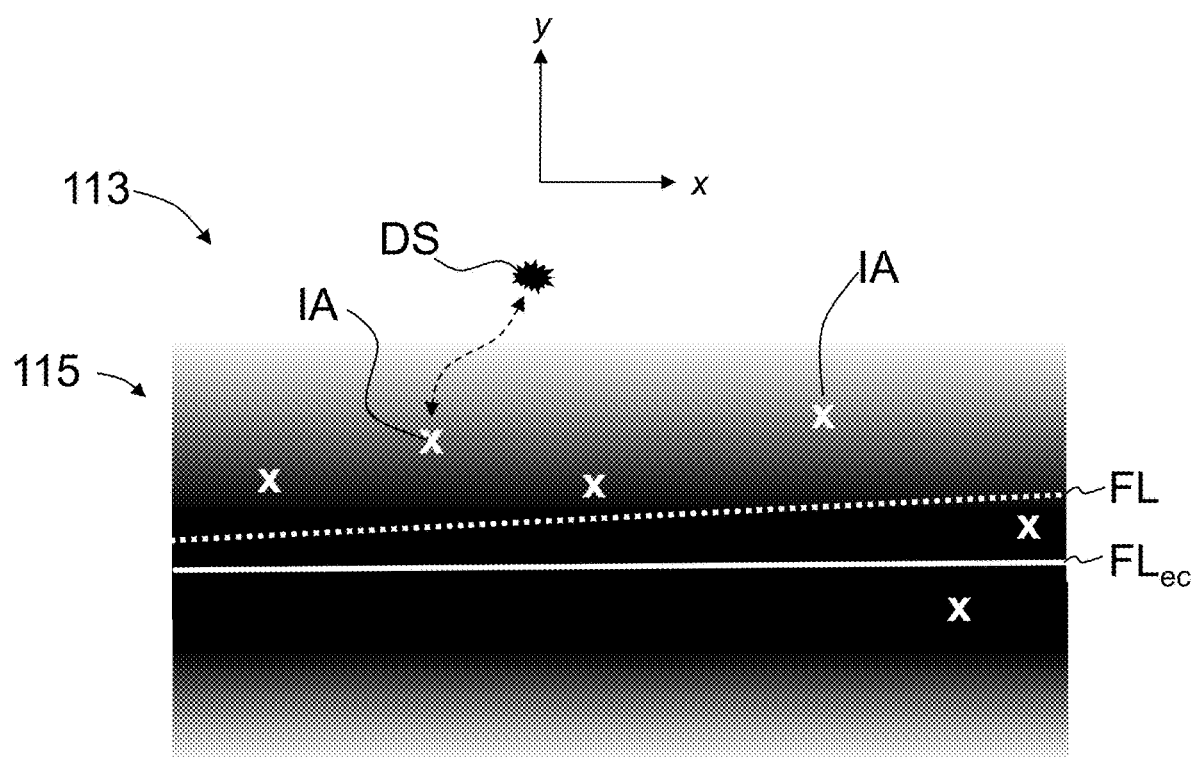
FIG. 10B is a close-up view illustrating an example of determining a position and orientation of a mode line using a fitted line where the mode line image has noise, with the dotted white line showing an uncorrected fitted line and the solid white line showing the error corrected fitted line.

FIG. 10B is a close-up view of an example section SM of a mode line 115 of a mode spectrum (image) 113 illustrating an example of determining a position and orientation of a mode line 115 when the mode line image has noise or "image anomalies" IA, indicated by white x's for clarity and which can be in the form of dirt specs DS that show up as small dark areas in the brighter portion of the mode line image. As mentioned above, once a fitted line FL to a mode line 115 is determined according to the two-layer method described above, it can be checked to see whether the determined fitted line FL was prone to noise that can cause an error.

The error checking step can be carried out by examining distances (errors) between each likely (candidate) point ($x_1$, $\hat{y}_i$) to the fitted line FL. If the distance is too big (i.e., exceeds a threshold distance), the candidate points may be associated with the dirt specs DS and not actually part of the mode line 115, as shown in FIG. 10B, and therefore can be omitted in the calculation of the fitted line. This "distance checking" can be performed by defining the following eqn. (1D) for the error e associated with distances between the points on the fitted line FL as follows:

$$e = |\hat{y}_i - ax_i - b| \geq k\sigma e = |\hat{y}_i ax_i - b| \geq k\sigma \quad (1D)$$

where σ is the standard deviation of the errors and k is a constant, which may be in the range of 2 to 4 depending how close one wishes to fit the points to the fitted line. Thus, in an example the threshold distance (kσ) is based on the standard deviation of the distances between the candidate points used to form the fitted line and the fitted line. The process of removing the anomalies from the fitted line FL by using eqn. (1D) can be iterative until no anomalies of significance exist in the collection and an accurate fitted line FL achieved.

In FIG. 10B, the dotted white line represents the initially determined fitted line FL without error correction while the solid white line represents the more accurate error-corrected fitted line $FL_{ec}$ using the error correction method based on eqn. 1D. Note how the initially determined fitted line FL is "pulled away" from the actual mode line location by the (dark) image anomalies IA.

Tilted Mode Lines

The method also includes finding the tilt of the mode lines. In one example, this is done by calculating an average slope α based on the slopes α of the mode lines in the given mode spectrum 113. Prior to averaging the slopes α for the individual mode lines, an aspect of the method is directed to ensuring that the mode lines as identified using Eqns. (1B) to (3B) above are true mode lines and not false mode lines, such as some other feature unrelated to the guided modes of the optical waveguide 26 defined by the IOX article 10.

The following example method can be used to identify and remove any false mode lines. First, the average variance $\overline{v}$ of the fitted line FL from the darker portion of the section of the mode spectrum (see FIG. 8A), for example, of 50% of the pixels, is calculated. Assuming the number of pixels is m, then the average variance is given by $\overline{v}$:

$$\overline{v} = \frac{\sum_{i=0}^{m}(y_i - ax_i - b)^2}{m} \quad (1E)$$

The average variance $\overline{v}$ is a measure of how well the fitted line FL fits to the darker pixels, with a larger number indicating a poor fit. A poor fit can indicate that the mode line being fitted is in fact a false mode line (e.g., a dark feature caused by an imaging error, debris, detector problem, etc.), or perhaps a very wide mode line.

Second, the results of the calculated slopes α of the mode lines, i.e., the values of the slopes α found from Eqn. (6B) or Eqn. (7C) are analyzed. Assuming there are a total of K mode lines (for both the TM and TE mode spectra 113TM and 113TE), a "z-score" of the slope of each mode line can be calculated as:

$$a_{zk} = \frac{a_k - \overline{a}}{\overline{\sigma}}; k = 1, 2 \ldots K \quad (2E)$$

where $\overline{\alpha}$ is the mean and $\overline{\sigma}$ is the standard deviation of the slope $\alpha_k$ from all the mode lines 115TM and 115TE in the mode spectrum 113. The z-score represents how many standard deviations the mode line's angular rotation is from the mean. A z-score equal to +/−2 means the quantity is 2 standard deviations away from the average. Anomalies in the parameter a relative to what is expected from a typical mode spectrum 113 and the typical mode lines 115TM and 115TE therein is a sign that the mode lines in question may be false mode lines.

A mode line may be removed from the set of mode lines being measured if its average variance $\overline{v}$ is very large and if the z-score $a_{zk}$ of the slope indicates that it is too far away from the average slope as compared to what is expected for an actual or "true" mode line. A combination of these two conditions can be used to ensure that only false mode lines are removed from the mode spectra being analyzed. As noted above, a false mode line can arise for example due to debris or marks on the IOX article 10, or from inoperable or malfunctioning portions of the detector 110 (e.g., regions of pixels) that show up as dark features on the measured mode spectrum 113.

In an example, removing a false mode line includes comparing the best-fit line to at least one expected mode line characteristic selected from the group of mode line characteristics comprising: a position, a width, a variance with respect to positions of dark pixels, a tilt angle and a slope.

The methods set forth herein to establish the position and tilt angle of a given mode line utilize closed-form analytic expressions and direct calculations rather than open-form equations that involving iterative calculations that require a convergence. Consequently, the methods disclosed herein for establishing the position and tilt for the mode lines in the mode spectra are substantially faster than the prior art methods involving iterative calculations. The use of a weighted least squares method also results in a more accurate determination of stress-related characteristics of the IOX article 10 being measured because the mode line positions are more accurately estimated.

Figure 11:
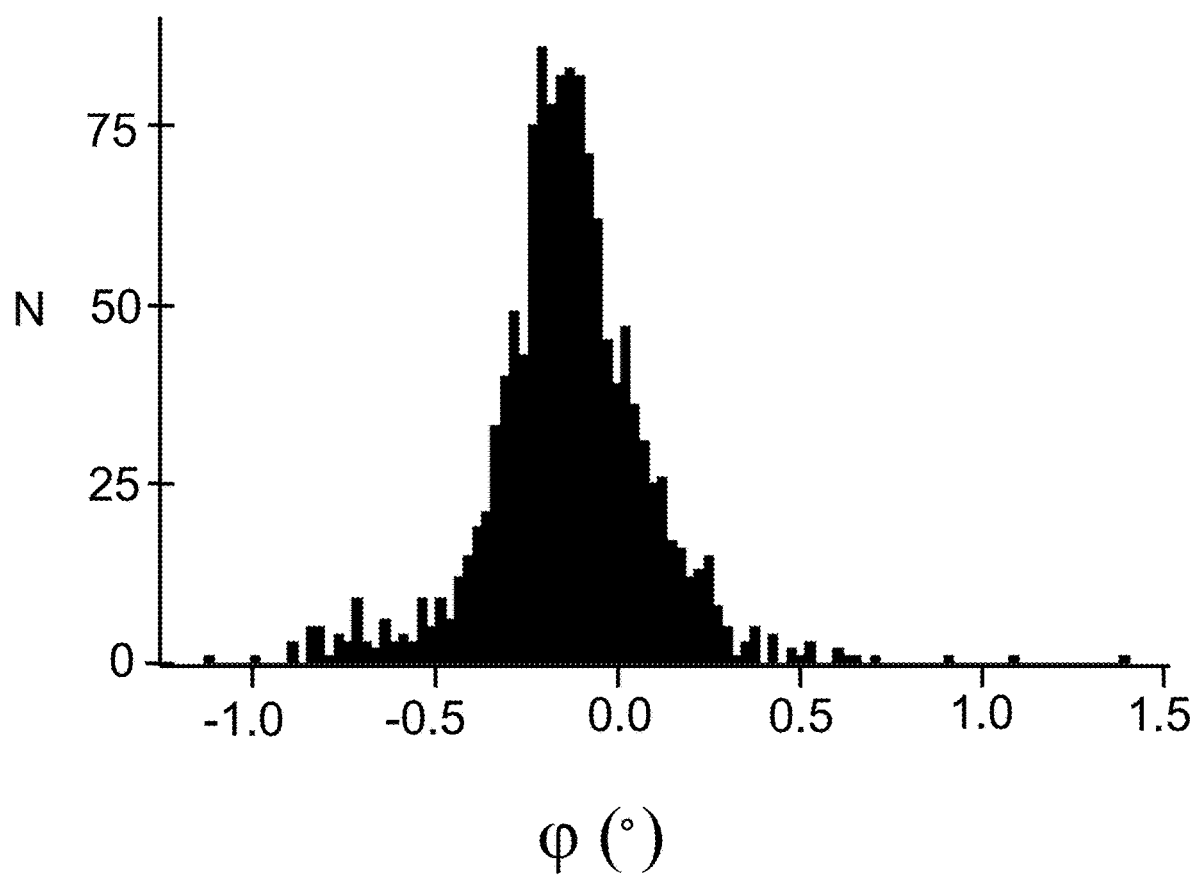
FIG. 11 is a histogram that plots the count N versus the tilt angle φ (in degrees) to illustrate the distribution in the tilt angle as calculated for 1295 mode spectra taken from different IOX articles and different prism-coupling systems, wherein the arithmetic mean of the tilt angles is called the bias tilt angle.

Experiments were conducted wherein measurements were made of different IOX articles 10 using different prism-coupling systems 28. The mode line positions and slopes α were calculated using the methods described above for a total of 1295 mode spectra. FIG. 11 is a histogram that plots the count N versus the tilt angle φ (in degrees) to illustrate the distribution in the tilt angles φ. The following parameters were used in the calculations in carrying out the above-described method of determining mode line positions and tilt angle φ:

$m_r = m_l = 20$
$z_{mr} = z_{ml} = 0.005$
$z_{pl} = 0.04$
$m_{IO} = 50$
$\alpha = 20$
$|\alpha_{zk}| \leq 1.7$
$\overline{v} \leq 30$.

The histogram of FIG. 11 shows the distribution of tilt angles φ has a mean of −0.133° and a standard deviation of 0.227°. This means that the prism-coupling systems 28 that were used to capture the mode spectra for the IOX articles have a non-zero tilt bias in their mode spectra. The tilt angles of the 1295 mode spectra were carefully examined and the mode spectra that reside outside 3 standard deviations from the average were excluded as false positives or analysis error. When such data for a single prism-coupling system 28 is compiled, the resulting mean tilt angle is denoted $\varphi_B$ and called the bias tilt angle. A similar quantity can be defined using the slope α as a measure of the tilt.

Figure 12A:
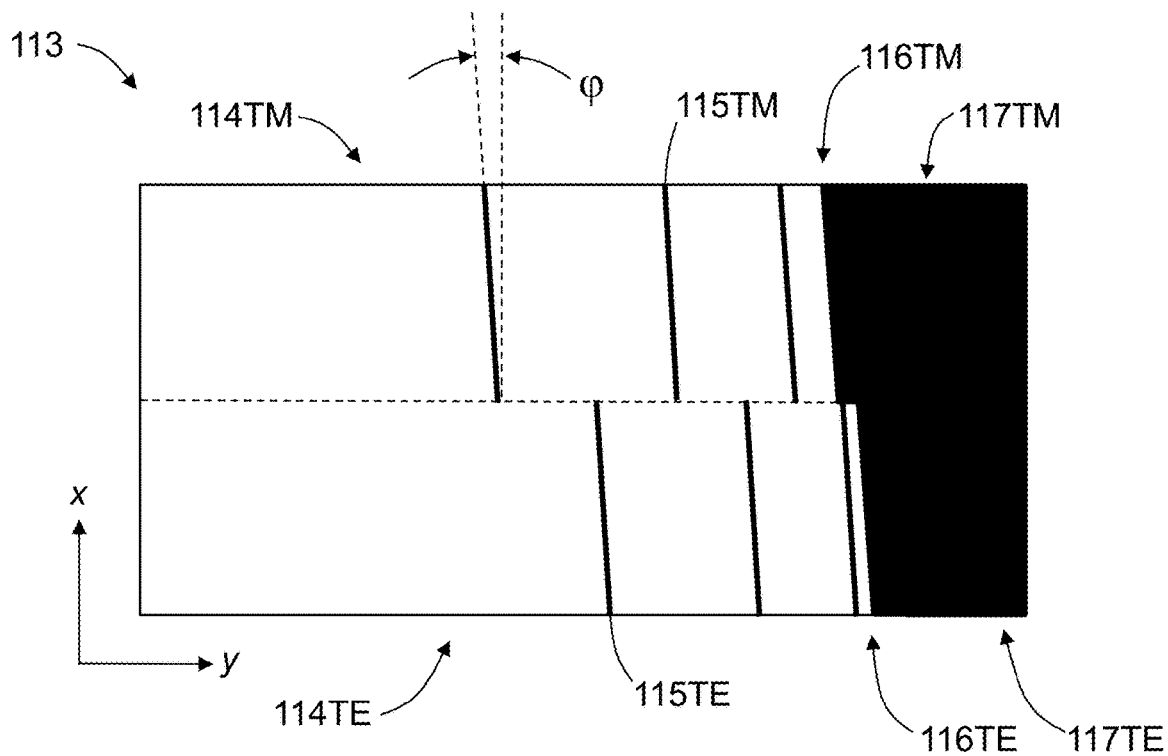
Figure 12B:
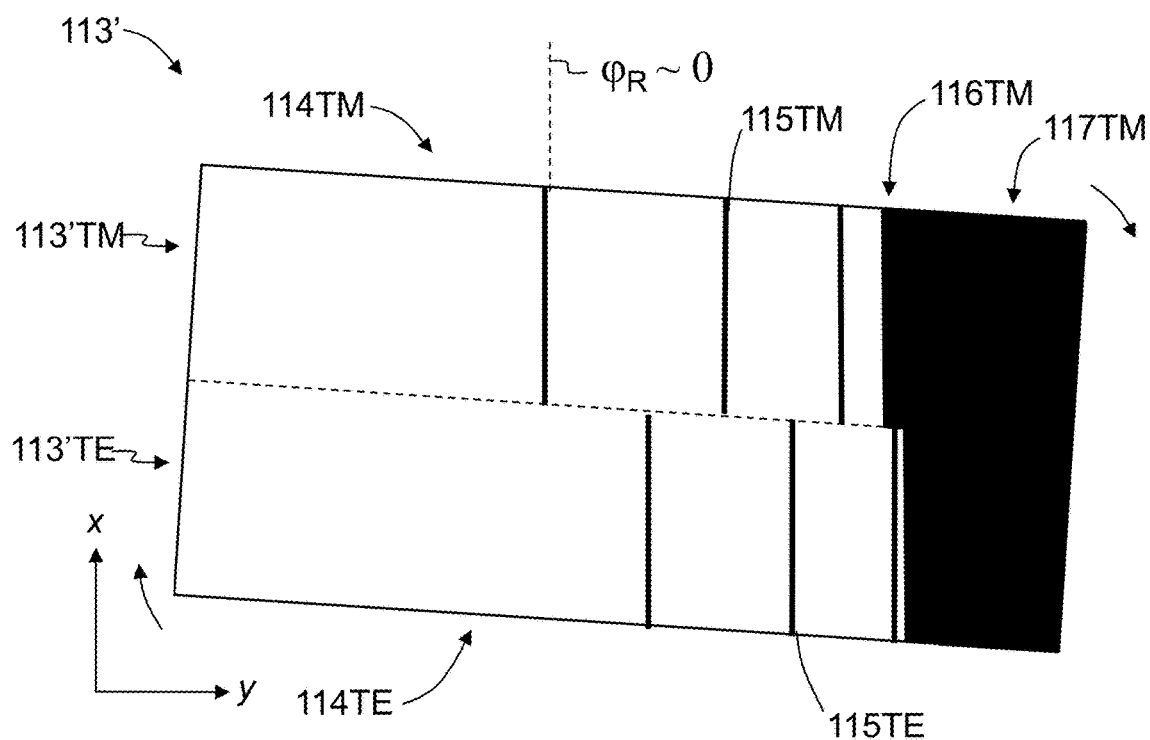

In another experiment, a mode spectrum 113 with tilted TM and TE mode lines 115TM and 115TE was captured and is shown in FIG. 12A, where the average tilt angle $\varphi_A$ was measured to be −2.788° using the methods set forth above. The digital mode spectrum 113 was then rotated (i.e., the digital mode spectrum image was rotated under the operation of the controller 150) by +2.788°, as shown in FIG. 12B, to vertically align the TM and TE mode lines 115TM and 115TE. It is noted that since the mode spectrum 113 is digital and thus comprises a grid of discrete image pixels 112P (see FIG. 3B), there can be a residual tilt angle $\varphi_R$ when a tilt angle correction is applied. In the present example, the residual tilt angle $\varphi_R$ was 0.061 degrees. In most if not all cases, a residual tilt angle $\varphi_R$ of this magnitude (e.g., hundredths of a degree) does not introduce substantial error in the subsequent calculations for the stress-related characteristic of the IOX article 10 being measured, so that $\varphi_R \cdot 0$.

The above-described methods are very fast and accurate in that they result in a relatively quick calculation of one or more stress-related characteristics of the IOX article 10 being measured.

Correcting Tilt Bias in the Prism-Coupling System

As shown in the histogram of FIG. 11, a given prism-coupling system 28 can have a bias tilt (e.g., bias tilt angle $\varphi_B$ or bias slope $\alpha_B$) and different prism-coupling systems tend to have different bias tilts. It is therefore desirable to improve prism-coupling systems 28 by adjusting the measurement system via either hardware or software to substantially reduce or remove this bias tilt so that the calculations of stress-related characteristics based on the compensated mode spectra obtained using the system provide a more accurate estimate of one or more stress-related characteristics of the IOX article 10 being measured.

An aspect of the disclosure is directed to methods of substantially compensating or correcting the bias tilt for a given prism-coupling system 28 to obtain tilt-compensated mode spectra 113. An example method includes determining an average or mean of the tilt angles φ or slopes α, along with the corresponding angle or slope variance (e.g., standard deviation) based on past measurements of IOX articles 10 and in particular the captured mode spectra. The mean and the standard deviation of the tilt angle or slope can be calculated, for example, from stored tilt angles or slopes from the measured mode spectra of all the IOX articles the particular prism-coupling system 28 has measured. The tilt angles φ or slopes α and the measured mode spectra 113 can be stored in the memory 154 of the controller 150. Because a given prism-coupling system 28 can measure thousands of IOX articles 10 over a relatively short period of time, the number of mode spectra 113 available is sufficient to generate statistically meaningful values of the mean and standard deviation of the tilt angles, i.e., the sample size is statistically significant.

In an alternative embodiment of the method, the mean and standard deviation of the tilt angles φ or slopes α are calculated based on running values rather than stored mode spectra data. The advantage of this alternative embodiment is that there are only two running statistical parameters (plus the number of measurements the prism-coupling system has undertaken) so that it demands much less resource for the computer and less time to access the stored data. Methods of performing the running calculations of the mean and standard deviation while making new measurements are explained below.

The data from the histogram of FIG. 11 yields a mean tilt angle of −0.133° and tilt-angle standard deviation of 0.227°, which indicates a non-zero bias tilt angle $\varphi_B$. Substantially compensating for or removing the bias tilt angle $\varphi_B$ improves the performance of the prism-coupling system by improving the quality of the capture mode spectra, which leads to a more accurate measurement of stress-related characteristics of the IOX articles being measured.

The tilt bias may mostly be due to hardware bias, i.e., from the dynamic interplay and imperfections in the various components of the prism-coupling system. The tilt bias may also come from measurement itself and the bias from both sources are preferably minimized to generate high-quality mode spectra. Reducing the tilt bias from the prism-coupling system 28 by improving the hardware (system components) may be costly and complicated and ultimately offers diminishing returns for the effort and cost.

Like the tilt bias, the tilt variance/standard deviation may be due to instrument hardware bias. The tilt variance can also result from variations between IOX articles 10, such as varying amounts of sample warp and the sample warp orientation relative to the input optical axis A1 of prism-coupling system measurement. It is also desirable to minimize the variance in the measurements. The tilt variance/standard deviation is an indicator of how consistent the measurements are and if the tilt variance/standard deviation exceeds a select tolerance it is an indication of a hardware problem and/or a measurement problem.

As noted above, there are two main approaches to calculating the tilt bias and the tilt variation, namely using all of the stored mode spectra data or to keep running records of three parameters (variables), namely: 1) the running average of the tilt angle up to the last image generated from the tested sample, 2) the running standard deviation of the tilt angle up to the last image generated from the tested sample, and 3) the number of images it has generated/analyzed.

With these three variables, the average and standard deviation are calculated/updated when a new measurement is so that it is not necessary to store all the tilt angle data.

Defining the mean slope $\bar{\alpha}$ and standard deviation $\sigma$ of the slope $\alpha_i$ after the nth mode spectra as:

$$\bar{a}_- = \frac{\sum_{i=1}^{n} a_i}{n}; \quad (3E)$$

$$\sigma_- = \frac{\sum_{i=1}^{n}(a_i - \bar{a}_-)^2}{n} = \frac{\sum_{i=1}^{n} a_i^2 - 2\bar{a}_-\sum_{i=1}^{n} a_i + n\bar{a}_-^2}{n} = \frac{\sum_{i=1}^{n} a_i^2 - n\bar{a}_-^2}{n}$$

The mean and standard deviation at the (n+1)th image are given by $$\bar{a}_+ = \frac{\sum_{i=1}^{n+1} a_i}{n+1} = \frac{n\bar{a}_- + a_{n+1}}{n+1}; \quad (4E)$$

$$\sigma_+ = \frac{\sum_{i=1}^{n+1} a_i^2 - (n+1)\bar{a}_+^2}{n+1} = \frac{n(\sigma_- + \bar{a}_-^2) + a_{n+1}^2 - (n\bar{a}_- + a_{n+1})^2/(n+1)}{n+1}$$

From Eqn. (4E), to update the running average/bias $\bar{\alpha}_+$ of the slope and its standard deviation $\sigma_+$ when new experiment (n+1) is done, only the new slope $\alpha_{n+1}$ and the three previous running variable are needed: the mean/bias $\bar{\alpha}_-$ of the slope and its standard deviation $\sigma_-$, and how many images n it has analyzed. There is no need to keep all the tilt data to update/find out the new running average $\bar{\alpha}_+$ and its standard deviation $\sigma_+$ at the (n+1)th image after a new image is analyzed.

After a few measurements are completed on a given prism-coupling system 28 and the mode spectra analyzed and when the calculations for running average and the standard deviation are stabilized, the tilt bias can be compensated, either via hardware or software. In an example, the prism-coupling system 28 is adjusted using the approaches discussed below by the amount of the tilt bias (but in the opposite direction) so that the mode spectra generated after the adjustment have a substantially zero-average tilt, keeping in mind that there can be some residual tilt as discussed above due the discrete/digital nature of the mode spectra. Mode spectra having substantially no tilt simplifies making accurate determination of the mode line location, which as noted above translates into accurate estimations of the stress-related characteristics of the IOX articles being measured.

The standard deviation of the tilt angle or slope is a measure of the consistency of the tilt between mode spectra. Large values of the tilt standard deviation/variance indicates that the prism-coupling system 28 is not stable, the IOX articles 10 are not consistently sited/contacted within the prism-coupler system, or one or more key physical characteristics of the IOX articles (e.g., warp) varies substantially. When the tilt standard deviation/variance exceeds a select threshold, evaluation of the prism-coupling system 28 and/or the IOX articles 10 is required to understand the source or sources of the measurement deviations.

In an example, the controller 150 of prism-coupling system 28 is configured (e.g., with instructions embodied in a non-transient computer-readable medium) to calculate and store the running average and standard deviation of the tilt angle of the mode lines as well as the number of mode spectra utilized for obtaining the running averages. When the absolute value of the tilt angle running average deviates from 0 by a select amount (i.e., tilt angle threshold), the prism-coupling system 28 is adjusted to reduce the average tilt (or tilt bias) so that it is below the tilt angle threshold and preferably is equal to or close to zero. Example tilt angle thresholds can be in the range from 0.001 radians to 0.006 radians. Example methods of adjusting the prism-coupling system 28 are discussed below.

In another example, the controller 150 includes instructions (e.g., software) embodied in a non-transient computer readable medium that enable adjustment of the tilt. In an example, the tilt observed on the display 151 is magnified to enable more precise elimination of the tilt-angle bias. For example, during the correction procedure the image of the mode spectrum can be shrunk vertically to exaggerate the tilt a, enabling an end user of the prism-coupling system 28 to visually observe the tilted mode lines. In addition, reference lines can be displayed at the same time to further highlight the tilt of the mode lines.

Adjusting the Prism-Coupling System

The prism-coupling system 28 can be adjusted in a variety of ways to reduce or remove tilt from the mode spectra. In one example, this is accomplished by rotating the detector 110 about the output optical axis A2 using the rotational drive system 136 of FIGS. 3C and 3D, discussed above. The rotational drive system 136 is configured to provide a select number $N_\beta$ of precise angular rotational increments $\delta\beta$ to change the angular orientation $\beta$ of the detector 110 to at least substantially compensate for the tilt bias of the prism-coupling system. The precision of the rotational adjustment of the detector 110 using the rotational drive systems 136 described above is substantially better than the standard deviation of the tilt angles. For example, as noted above, the angular increment $\delta\beta$ provided by the rotational drive system 136 can be in the range from 0.15 degrees to 0.05 degrees (i.e., 0.0026 radians to 0.0009 radians).

The amount of tilt compensation is calculated from the measured tilt-angle bias of the prism-coupling system as described above. The rotational drive system 136 is then activated to change the rotational orientation of the detector 110 (e.g., by a suitable number $N_\beta$ of angular increments $\delta\beta$) relative to the coupling prism 40 (i.e., relative to the output optical axis A2 or equivalently a reference line perpendicular thereto) by an amount $\beta = N_\beta \cdot \delta\beta$ that substantially compensates or cancels the measured tilt bias. The prism-coupling system 28 is then operated going forward without a substantial tilt bias, which translates into more accurate estimates of the stress-related characteristics of the IOX articles being measured.

In another example, when the tilt for an individual mode spectrum is measured, if the absolute value (magnitude) of the tilt falls within a select tilt threshold limit value, the mode spectrum is used for fast processing. In this case, compensating for any tilt of the given mode spectrum is omitted to save time.

In an example, the controller 150 can monitor the tilt bias in the mode spectrum using the running methods described above that calculates and stores running averages for the tilt, the standard deviation of the tilt, and the number of mode spectra used in calculating the running averages and standard deviation. When the absolute value of the running average of the tilt exceeds a select tilt threshold, the controller automatically applies a software correction for the tilt for subsequently measured mode spectra. An example threshold of the tilt angle can be in the range from 0.006 radians to 0.001 radians, i.e., from about 0.0034 degrees to about 0.057 degrees. Corresponding threshold values can be applied when using the slope $\alpha$ instead of the tilt angle.

The software-based method of correcting tilt is shown schematically in FIGS. 12A and 12B introduced and discussed above, wherein the digitally captured mode spectra 113 is rotated so that the mode lines 115TM and 115TE substantially align to the vertical direction, i.e., to the local y-direction associated with a tilt angle of zero. The mode spectrum 113 in FIG. 12B is denoted 113' (with mode spectra 113'TM and 113'TE) because it is a tilt-compensated mode spectrum. The tilt-compensated mode spectrum 113' can be processed using techniques known in the art to estimate one or more stress-related characteristics of the given IOX article 10. This provides a more accurate estimate of stress-related characteristics of the IOX article 10 as compared to using the uncompensated mode spectrum having the tilted mode lines.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method implemented by a prism coupling system of estimating at least one stress-related characteristic of an ion-exchange (IOX) article having a waveguide region, comprising:
    illuminating the IOX article through a coupling prism to generate transverse magnetic (TM) and transverse electric (TE) guided modes in the waveguide region of the IOX article;
    capturing a digital two-dimensional (2D) mode spectrum comprising mode lines of a TM mode spectrum and a TE mode spectrum representative of the TM and TE guided modes of the waveguide region, wherein each mode line is defined by a 2D intensity profile having intensity values and an intensity extremum and having an amount of tilt in a first direction as measured relative to an ideal reference orientation;
    locating the mode lines by fitting at least one fitted line to at least one of the mode lines in a vicinity of its intensity extremum in the 2D mode spectrum using a weighted least square regression calculation in the vicinity of the intensity extremum;
    measuring the amount of tilt using the at least one fitted line;
    substantially removing the amount of tilt from the mode lines by adding the measured amount of tilt in a second direction opposite to the first direction to define at least one of a tilt-compensated TM mode spectrum or a tilt-compensated TE mode spectrum; and
    estimating the at least one stress-related characteristic of the IOX article using at least one of the tilt-compensated TM mode spectrum and the tilt-compensated TE mode spectrum.

2. The method according to claim 1, wherein the intensity extremum comprises an intensity minimum.

3. The method according to claim 1, further comprising averaging the 2D mode spectrum to form a one-dimensional (1D) spectrum having an averaged intensity extremum for each mode line and determining an initial position for each mode line using the averaged intensity extremum.

4. The method according to claim 1, wherein the 2D mode spectrum comprises a digital mode spectrum image having a gray scale intensity distribution based on pixel intensity values, and wherein the weighted least square regression calculation for each mode line comprises:
    defining a weighting that emphasizes pixel intensity values closer to the intensity extremum to force the fitted line to more closely hew to the 2D intensity extremum.

5. The method according to claim 4, wherein the weighting is defined by an exponential weighting function.

6. The method according to claim 1, further comprising:
    determining an average variance of the fitted line to the 2D intensity profile in the vicinity of the intensity extremum; and
    using the average variance for each mode line to assess whether each mode line is a true mode line or a false mode line.

7. The method according to claim 6, wherein there are K mode lines, and the using the average variance for each mode line to assess whether each mode line is a true mode line or a false mode line comprises:

determining a tilt slope $\alpha_k$ for each mode line k, an average tilt slope $\overline{\alpha}$ and a standard deviation $\overline{\sigma}$ of the tilt slope to define a slope variation parameter $a_{zk}$ using the at least one fitted line;

$$a_{zk} = \frac{a_k - \overline{a}}{\sigma}; k = 1, 2 \ldots K$$

and
defining a threshold parameter T, wherein $\alpha_{zk}$<T for a given mode line means the corresponding mode line is a true mode line.

8. The method according to claim 7, wherein T≤2.

9. The method according to claim 1, wherein the at least one stress-related characteristic comprises: a stress profile, a knee stress, a center tension, a tension-strain energy, a birefringence, a spike depth, a depth of layer, a refractive index profile, or combinations thereof.

10. The method according to claim 1, wherein the 2D mode spectrum is captured on a rotatable detector, and wherein the substantially removing the amount of tilt from the mode lines by adding the measured amount of tilt comprises rotating the rotatable detector.

11. The method according to claim 1, wherein the 2D mode spectrum is captured on a digital detector, and wherein the substantially removing the amount of tilt from the mode lines by adding the measured amount of tilt comprises digitally rotating the mode spectrum.

12. A method implemented by a prism coupling system of estimating at least one stress-related characteristic of an ion-exchange (IOX) article having a waveguide region, comprising:

illuminating the IOX article through a coupling prism to generate transverse magnetic (TM) and transverse electric (TE) guided modes in the waveguide region of the IOX article;

capturing a digital mode spectrum comprising mode lines of a TM mode spectrum and a TE mode spectrum representative of the TM and TE guided modes of the waveguide region;

calculating at least one of a TE derivative spectrum or a TM derivative spectrum from the corresponding mode spectrum comprising derivative intensity transitions corresponding to intensity transitions in the corresponding mode spectrum;

for each derivative intensity transition, determining a fitted line representative of a position of the derivative intensity transition, to define a set of fitted lines having respective positions in at least one of the TE mode spectrum or the TM mode spectrum;

performing error checking on each fitted line in the set of fitted lines to assess whether the associated derivative intensity transition corresponds to a mode line or to noise in the mode spectrum and discarding any of the fitted lines found to be due to noise, thereby establishing at least one of a set of checked fitted lines for the TE mode spectrum or a set of checked fitted lines for the TM mode spectrum;

defining estimated positions of the intensity transitions in at least one of the TE mode spectrum or the TM mode spectrum as the respective positions of the set of checked fitted lines to define at least one of a corrected TE mode spectrum or a corrected TM mode spectrum, respectively; and estimating the at least one stress-related characteristic of the IOX article using at least one of the corrected TM mode spectrum or the corrected TE mode spectrum.

13. The method according to claim 12, wherein the intensity transitions comprise mode lines and critical angle transitions, and wherein the derivative intensity transitions comprise derivative lines and derivative critical transition lines.

14. The method according to claim 12, wherein the determining the fitted line is performed using either a weighted linear regression method or a two-layer weighted regression method.

15. The method according to claim 12, further comprising:

averaging at least one of the TE mode spectrum and the TM mode spectrum in a direction that is along a length of the intensity transitions to form an averaged mode spectrum; and using the averaged mode spectrum to form the corresponding derivative spectrum.

16. The method according to claim 12, wherein the calculating the at least one of the TE derivative spectrum or the TM derivative spectrum utilizes a finite-difference method that includes performing an intensity normalization so that the derivative intensity transitions of the corresponding derivative spectrum are in a range between 0 and 1.

17. The method according to claim 12, wherein the performing error checking comprises:

comparing intensity values of candidate points used to form the fitted line to a threshold distance from the fitted line, wherein the threshold distance is based on the fitted line and a standard deviation of distances between candidate points used to form the fitted line; and excluding those candidate points that exceed the threshold distance.

18. The method according to claim 12, wherein the determining the fitted line representative of the position of the derivative intensity transition comprises:

identifying a valley point VP' corresponding to a local minimum of the corresponding derivative spectrum and a peak point PP' corresponding to a local minimum of the corresponding derivative spectrum;

isolating a portion of the corresponding derivative spectrum between the valley point VP' and the peak point PP', wherein the derivative intensity transition is located between the valley point VP' and the peak point PP'; and determining the fitted line in the portion of the corresponding derivative spectrum between the valley point VP' and the peak point PP'.

19. A prism coupling system for measuring at least one stress-related characteristic of an ion-exchanged (IOX) article having a waveguide region, comprising:

a light source system configured to generate input light along an input optical axis;

a coupling prism configured to interface with the IOX article to define a coupling interface, wherein the input light incident upon the coupling interface reflects therefrom to form reflected light that exits the coupling prism and travels along an output optical axis, the reflected light comprises a guided mode spectrum comprising mode lines of transverse magnetic (TM) and transverse electric (TE) guided mode spectra with positions as defined by the waveguide region;

a digital sensor comprising pixels and configured to detect the TM and TE guided mode spectra and form therefrom a two dimensional (2D) digital image of the TM and TE guided mode spectra;

a controller configured to receive the 2D digital image of the TM and TE guided mode spectra, the controller having instructions stored in a non-transitory computer-readable medium that cause the controller to carry out the following acts:

i) establishing for each mode line an amount of tilt;

ii) establishing from the amounts of tilt for the mode lines an average amount of tilt and a tilt variance;

iii) subtracting the average amount of tilt from the mode spectrum to define a tilt-compensated mode spectrum that has a reduced amount of tilt for each of the mode lines; and iv) estimating the at least one stress-related characteristic of the IOX article using the tilt-compensated mode spectrum.

20. The prism-coupling system according to claim 19, wherein the digital sensor is rotatable about the output optical axis, and the controller is configured to rotate the digital sensor as part of the subtracting the average amount of tilt from the mode spectrum.

* * * * *

UNITED STATES PATENT AND TRADEMARK OFFICE
CERTIFICATE OF CORRECTION

PATENT NO. : 11,448,595 B2
APPLICATION NO. : 17/084738
DATED : September 20, 2022
INVENTOR(S) : Ryan Claude Andrews et al.

It is certified that error appears in the above-identified patent and that said Letters Patent is hereby corrected as shown below:

In the Claims

In Column 35, Line 7, in Claim 7, delete "$a_{zk}$" and insert -- $\alpha_{zk}$ --.

Signed and Sealed this
First Day of August, 2023

Katherine Kelly Vidal
*Director of the United States Patent and Trademark Office*